(12) United States Patent
Wei et al.

(10) Patent No.: US 10,630,364 B2
(45) Date of Patent: Apr. 21, 2020

(54) CSI FEEDBACK PROCESSING AND REPORTING FOR EB/FD-MIMO

(71) Applicant: QUALCOMM Incorporated, San Diego, CA (US)

(72) Inventors: Chao Wei, Beijing (CN); Yu Zhang, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/765,575

(22) PCT Filed: Sep. 28, 2016

(86) PCT No.: PCT/CN2016/100669
§ 371 (c)(1),
(2) Date: Apr. 3, 2018

(87) PCT Pub. No.: WO2017/076139
PCT Pub. Date: May 11, 2017

(65) Prior Publication Data
US 2019/0081676 A1 Mar. 14, 2019

(30) Foreign Application Priority Data
Nov. 6, 2015 (WO) ................ PCT/CN2015/093984

(51) Int. Cl.
*H04L 23/02* (2006.01)
*H04B 7/06* (2006.01)
(Continued)

(52) U.S. Cl.
CPC ......... *H04B 7/0626* (2013.01); *H04B 7/0417* (2013.01); *H04B 7/063* (2013.01);
(Continued)

(58) Field of Classification Search
CPC ..... H04L 1/0054; H04L 1/005; H04L 5/0057; H04L 5/0004; H04B 7/0478;
(Continued)

(56) References Cited

U.S. PATENT DOCUMENTS

2014/0126620 A1  5/2014 Maltsev et al.
2015/0124688 A1  5/2015 Xu et al.
(Continued)

FOREIGN PATENT DOCUMENTS

CN   102546110 A   7/2012
CN   103580810 A   2/2014
(Continued)

OTHER PUBLICATIONS

Huawei., "Hisilicon Discussion on aperiodic CSI Prosessing Complexity in Rel-11 CoMP", 3GPP TSG RAN WG1 Meeting #76, R1-140517, Feb. 14, 2014, pp. 1-4.
(Continued)

*Primary Examiner* — Khai Tran
(74) *Attorney, Agent, or Firm* — Liem T. Do

(57) ABSTRACT

Channel state information (CSI) operations are disclosed with regard to elevation beamforming (EB)/full dimension (FD) multiple input, multiple output (ED/FD-MIMO) operations. With CSI processing associated with multiple CSI-reference signal (CSI-RS) resources, ambiguities may arise in determining the CSI reporting type and rank. CSI reporting type may be determined using a last reported beam selection indicator (BI) or, in the absence of a BI, may be determined according to a predefined rule. When rank and BI are reported separately and rank is absent, user equipment may determine a default reference rank for CSI reporting based on either or both of previously reported rank or BI. When rank and BI are jointly reported, encoding schemes with fixed bitwidths determined based on either CSI-RS
(Continued)

processes or resources may be used to enhance decoding. CSI-RS antenna ports, processes, or resources may also be used in determining application of CSI processing relaxation.

24 Claims, 12 Drawing Sheets

(51) Int. Cl.
    *H04B 7/0417*     (2017.01)
    *H04B 7/08*     (2006.01)
    *H04L 1/00*     (2006.01)

(52) U.S. Cl.
    CPC .......... *H04B 7/0695* (2013.01); *H04B 7/088* (2013.01); *H04L 1/0026* (2013.01); *H04B 7/0639* (2013.01)

(58) Field of Classification Search
    CPC .. H04B 7/0486; H04B 7/0408; H04B 7/0617; H04B 7/0626; H04W 72/085; H04W 16/28
    USPC .......................................... 375/262, 260, 267
    See application file for complete search history.

(56) References Cited

U.S. PATENT DOCUMENTS

| | | | |
|---|---|---|---|
| 2016/0212786 A1* | 7/2016 | Hwang | H04B 7/2656 |
| 2018/0042000 A1* | 2/2018 | Zhang | H04B 7/04 |
| 2018/0213527 A1* | 7/2018 | Liu | H04B 7/0478 |
| 2019/0158155 A1* | 5/2019 | Park | H04B 7/04 |

FOREIGN PATENT DOCUMENTS

| | | |
|---|---|---|
| CN | 103733542 A | 4/2014 |
| CN | 104170411 A | 11/2014 |
| EP | 3371895 A1 | 9/2018 |
| WO | WO-2017078785 A1 | 5/2017 |

OTHER PUBLICATIONS

International Search Report and Written Opinion—PCT/CN2015/093984—ISA/EPO—dated Jul. 27, 2016.
International Search Report and Written Opinion—PCT/CN2016/100669—ISA/EPO—dated Jan. 4, 2017.
Onggosanusi E., "Elevation Beaforming/Full-Dimension(FD) MIMO for LTE", 3GPP TSG RAN Meeting #69, RP-151565, Sep. 16, 2015, pp. 1-9.
CATT: "Beam Selection Indicator on PUSCH for CSI Reporting Class B", 3GPP Draft; R1-155216, 3rd Generation Partnership Project (3GPP), Mobile Competence Centre, 650, Route Des Lucioles ; F-06921 Sophia-Antipolis Cedex, France, vol. RAN WG1, No. Malmo, Sweden; Oct. 5, 2015-Oct. 9, 2015, Oct. 4, 2015 (Oct. 4, 2015), 4 Pages, XP051002185, Retrieved from the Internet: URL: http://www.3gpp.org/ftp/Meetings_3GPP_SYNC/RAN1/Docs/ [retrieved on Oct. 4, 2015], Section 2.3.
LG Electronics: "Enhancements on Beamformed CSI-RS based CSI Reporting", 3GPP Draft; R1-154279, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015, Aug. 23, 2015, XP051001610, Retrieved from the Internet: URL:http://www.3gpp.org/ftp/Meetings_3GPP_SYNC/RAN1/Docs/ [retrieved on Aug. 23, 2015], 4 Pages.
Samsung: "BI and PMI Reporting for Class B", 3GPP Draft; R1-155505, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015, Oct. 4, 2015, XP051039671, Retrieved from the Internet: URL: http://www.3gpp.org/ftp/Meetings_3GPP_SYNC/RAN1/Docs/ [retrieved on Oct. 4, 2015], 5 Pages.
Supplementary European Search Report—EP16861407—Search Authority—Munich—dated Aug. 14, 2019.
Supplementary Partial European Search Report—EP16861407—Search Authority—Munich—dated Apr. 25, 2019.

* cited by examiner

FIG. 6A

FIG. 6B

CSI FEEDBACK PROCESSING AND REPORTING FOR EB/FD-MIMO

CROSS-REFERENCE TO RELATED APPLICATIONS

This application claims the benefit of an International PCT Patent Application No. PCT/CN2015/093984, entitled, "CSI FEEDBACK PROCESSING AND REPORTING FOR EB/FD-MIMO," filed on Nov. 6, 2015, which is expressly incorporated by reference herein in its entirety.

BACKGROUND

Field

Aspects of the present disclosure relate generally to wireless communication systems, and more particularly, to channel state information (CSI) feedback processing and reporting for elevation beamforming (EB) and full-dimensional (FD) multiple input, multiple output (MIMO).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks. Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes obtaining identification of a plurality of channel state information—reference signals (CSI-RS) resources associated with a CSI process, determining whether a previous beam selection indicator was reported to the serving base station in a last beam selection indicator reporting opportunity, in response to determining the previous beam selection indicator was reported: determining a CSI-RS resource of the plurality of CSI-RS resources indicated by the previous beam selection indicator, and selecting a channel state information (CSI) reporting type based on a number of antenna ports associated with the determined CSI-RS resource, and reporting CSI to the serving base station according to the selected CSI reporting type.

In an additional aspect of the disclosure, a method of wireless communication includes obtaining identification of a plurality of CSI-RS resources associated with a CSI process, determining to combine a beam selection indicator and a rank indicator into a joint report for reporting to the serving base station, wherein the beam selection indicator identifies a CSI-RS resource of the plurality of CSI-RS resources, setting a bit width for the joint report, wherein the bit width is fixed based on a predefined rule, encoding the joint report, and transmitting the encoded joint report to the serving base station.

In an additional aspect of the disclosure, a method of wireless communication includes receiving a plurality of CSI requests for CSI reporting for one or more component carriers (CCs), identifying one or more unreported CSI requests of the plurality of CSI requests, wherein the one or more unreported CSI requests are determined before a current CSI triggering subframe. determining a total number of CSI-RS ports combined across all the one or more unreported CSI requests, wherein the total number of CSI-RS ports is determined on one of: per CC or over all of the one or more CCs, and performing CSI feedback relaxation for one or more CSI requests of the plurality of CSI requests in response to the total number of CSI-RS ports exceeding a triggering threshold.

In an additional aspect of the disclosure, an apparatus configured for wireless communication includes means for obtaining identification of a plurality of CSI-RS resources associated with a CSI process, means for determining whether a previous beam selection indicator was reported to the serving base station in a last beam selection indicator reporting opportunity, in response to determining the previous beam selection indicator was reported: means for determining a CSI-RS resource of the plurality of CSI-RS resources indicated by the previous beam selection indicator, and means for selecting a CSI reporting type based on a number of antenna ports associated with the determined CSI-RS resource, and means for reporting CSI to the serving base station according to the selected CSI reporting type.

In an additional aspect of the disclosure, an apparatus configured for wireless communication includes means for obtaining identification of a plurality of CSI-RS resources associated with a CSI process, means for determining whether to combine a beam selection indicator and a rank indicator into a joint report for reporting to the serving base station, wherein the beam selection indicator identifies a CSI-RS resource of the plurality of CSI-RS resources, means for setting a bit width for the joint report, wherein the bit width is fixed based on a predefined rule, means for encoding the joint report, and means for transmitting the encoded joint report to the serving base station.

In an additional aspect of the disclosure, an apparatus configured for wireless communication includes means for receiving a plurality of CSI requests for CSI reporting for one or more CCs, means for identifying one or more unreported CSI requests of the plurality of CSI requests, wherein the one or more unreported CSI requests are determined before a current CSI triggering subframe, means for determining a total number of CSI-RS ports combined across all the one or more unreported CSI requests, wherein the total number of CSI-RS ports is determined on one of: per CC or over all of the one or more CCs, and means for performing CSI feedback relaxation for one or more CSI requests of the plurality of CSI requests in response to the total number of CSI-RS ports exceeding a triggering threshold.

In an additional aspect of the disclosure, a non-transitory computer-readable medium having program code recorded thereon. The program code further includes code to obtain identification of a plurality of CSI-RS resources associated with a CSI process, code to determine whether a previous beam selection indicator was reported to the serving base station in a last beam selection indicator reporting opportunity, execution in response to determining the previous beam selection indicator was reported of: code to determine a CSI-RS resource of the plurality of CSI-RS resources indicated by the previous beam selection indicator, and code to select a CSI reporting type based on a number of antenna ports associated with the determined CSI-RS resource, and code to report CSI to the serving base station according to the selected CSI reporting type.

In an additional aspect of the disclosure, a non-transitory computer-readable medium having program code recorded thereon. The program code further includes code to obtain identification of a plurality of CSI-RS resources associated with a CSI process, code to determine whether to combine a beam selection indicator and a rank indicator into a joint report for reporting to the serving base station, wherein the beam selection indicator identifies a CSI-RS resource of the plurality of CSI-RS resources, code to set a bit width for the joint report, wherein the bit width is fixed based on a predefined rule, code to encode the joint report, and code to transmit the encoded joint report to the serving base station.

In an additional aspect of the disclosure, a non-transitory computer-readable medium having program code recorded thereon. The program code further includes code to receive a plurality of CSI requests for CSI reporting for one or more CCs, code to identify one or more unreported CSI requests of the plurality of CSI requests, wherein the one or more unreported CSI requests are determined before a current CSI triggering subframe, code to determine a total number of CSI-RS ports combined across all the one or more unreported CSI requests, wherein the total number of CSI-RS ports is determined on one of: per CC or over all of the one or more CCs, and code to perform CSI feedback relaxation for one or more CSI requests of the plurality of CSI requests in response to the total number of CSI-RS ports exceeding a triggering threshold.

In an additional aspect of the disclosure, an apparatus configured for wireless communication is disclosed. The apparatus includes at least one processor, and a memory coupled to the processor. The processor is configured to obtain identification of a plurality of CSI-RS resources associated with a CSI process, to determine whether a previous beam selection indicator was reported to the serving base station in a last beam selection indicator reporting opportunity, configuration in response to determining the previous beam selection indicator was reported: to determine a CSI-RS resource of the plurality of CSI-RS resources indicated by the previous beam selection indicator, and to select a CSI reporting type based on a number of antenna ports associated with the determined CSI-RS resource, and to report CSI to the serving base station according to the selected CSI reporting type.

In an additional aspect of the disclosure, an apparatus configured for wireless communication is disclosed. The apparatus includes at least one processor, and a memory coupled to the processor. The processor is configured to obtain identification of a plurality of CSI-RS resources associated with a CSI process, to determine whether to combine a beam selection indicator and a rank indicator into a joint report for reporting to the serving base station, wherein the beam selection indicator identifies a CSI-RS resource of the plurality of CSI-RS resources, to set a bit width for the joint report, wherein the bit width is fixed based on a predefined rule, to encode the joint report, and to transmit the encoded joint report to the serving base station.

In an additional aspect of the disclosure, an apparatus configured for wireless communication is disclosed. The apparatus includes at least one processor, and a memory coupled to the processor. The processor is configured to receive a plurality of CSI requests for CSI reporting for one or more CCs, to identify one or more unreported CSI requests of the plurality of CSI requests, wherein the one or more unreported CSI requests are determined before a current CSI triggering subframe, to determine a total number of CSI-RS ports combined across all the one or more unreported CSI requests, wherein the total number of CSI-RS ports is determined on one of: per CC or over all of the one or more CCs, and to perform CSI feedback relaxation for one or more CSI requests of the plurality of CSI requests in response to the total number of CSI-RS ports exceeding a triggering threshold.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 6A and 6B are block diagrams illustrating CSI reporting streams from UEs configured according to aspects of the present disclosure.

DETAILED DESCRIPTION

Figure 1:
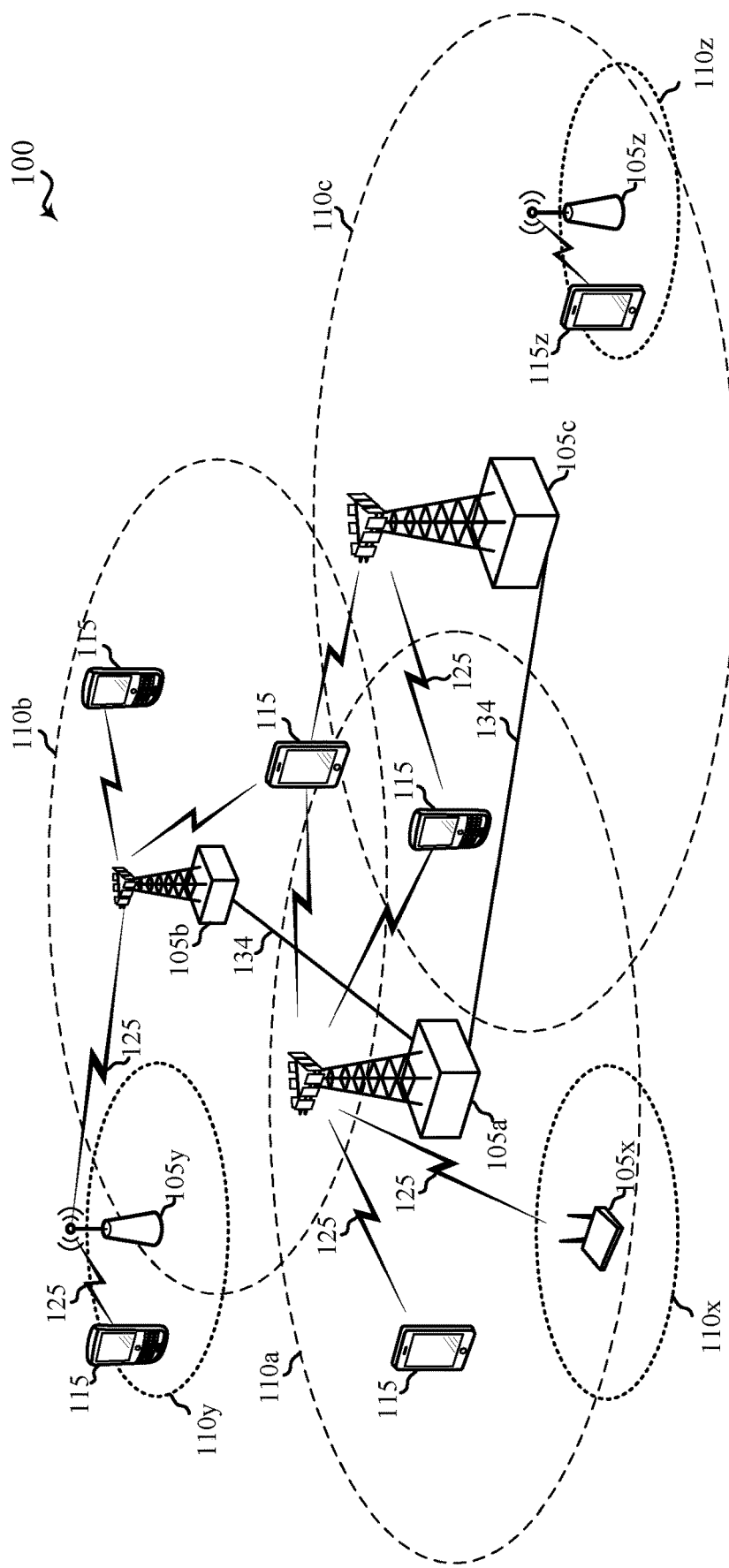
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network. through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi, LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs. which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
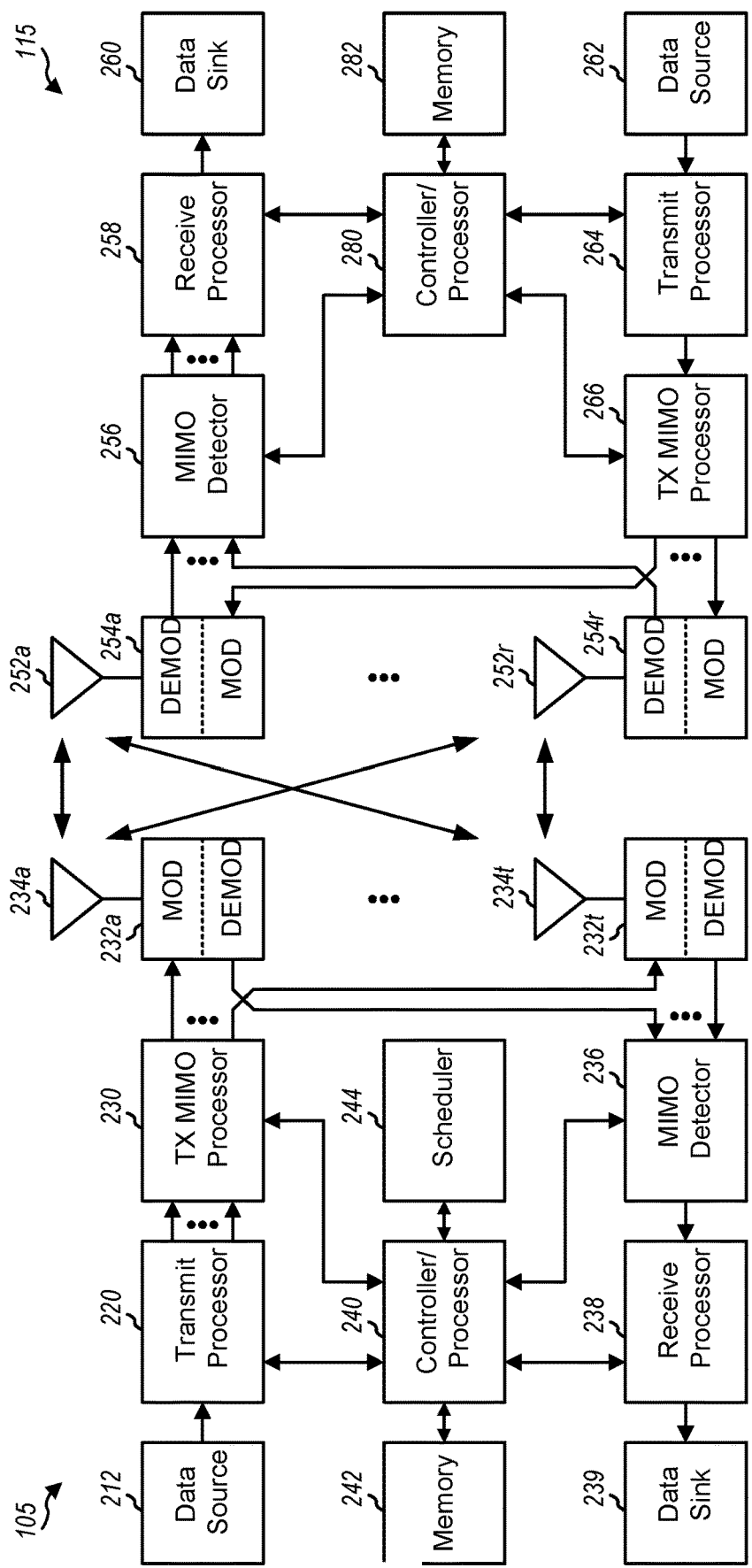
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 4, 7, and 8, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS configuration and transmission mode. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
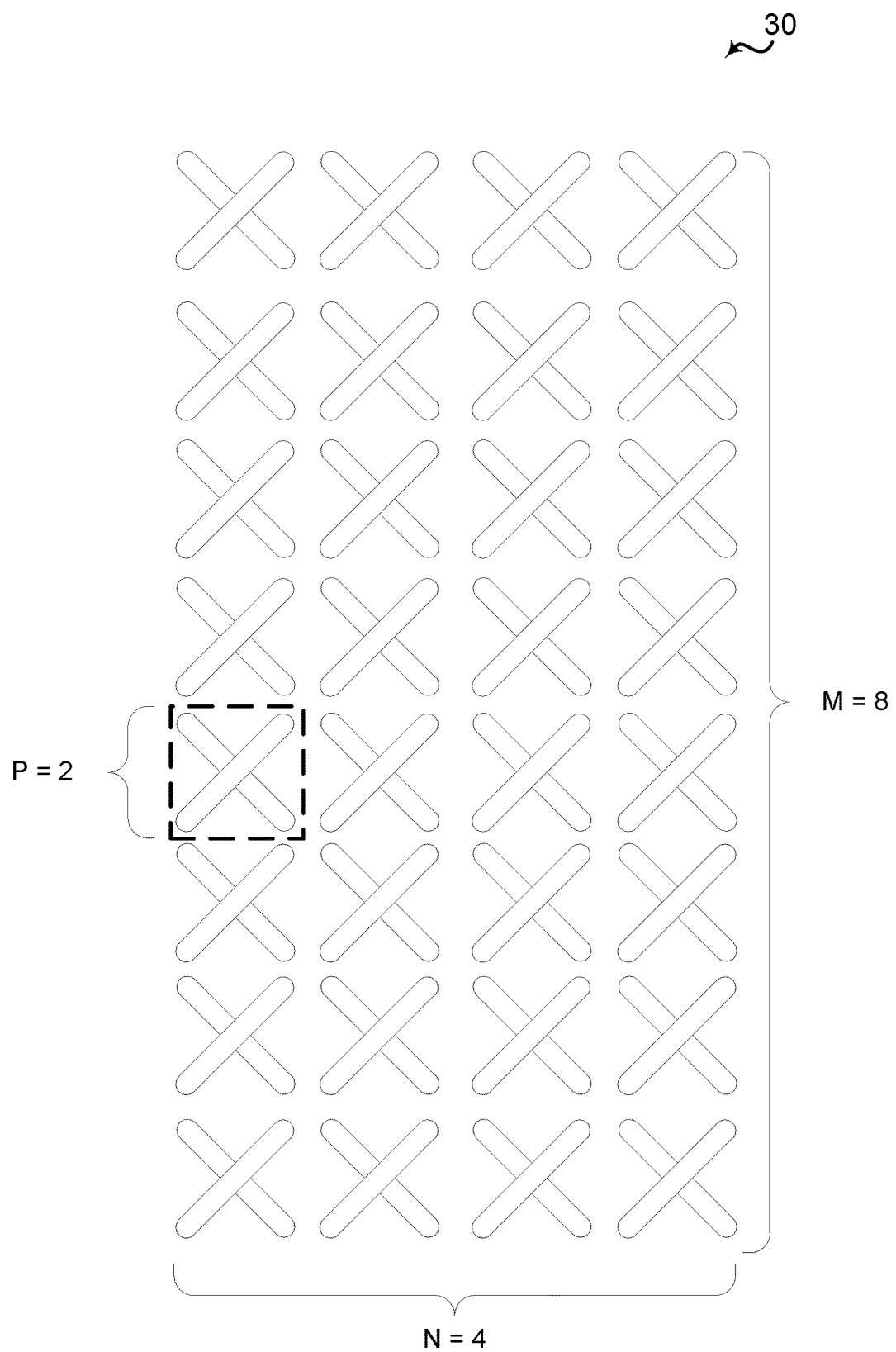
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook(s). However, different from the conventional MIMO system. the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

For CSI reporting in systems have elevation beamforming (EB)-MIMO or FD-MIMO, a CSI process may be configured with either of two CSI reporting classes, class A or class B. In class A reporting, one non-zero power (NZP) CSI-RS resource per CSI process may be used for channel measurement in which the number of CSI-RS ports may be 8, 12, or 16. Interference measurement in class A reporting may include one CSI-IM resource per CSI process.

In class B CSI reporting, each CSI process may be associated with K NZP CSI-RS resources/configurations, with $N_k$ ports for the $k^{th}$ CSI-RS resource (K could be ≥1), in which $N_k$ may be 1, 2, 4, or 8, and may be different for each CSI-RS resource. Each CSI-RS resource may also have different CSI-RS port virtualization, e.g., virtualized from different sets of antenna elements or from the same set of antenna elements but with different beamforming weights. Multiple CSI-interference measurement (IM) per CSI process is also possible, with one-to-one linkage to each NZP CSI-RS resource.

In reporting CSI in class B with K>1 CSI-RS resources, for a given CSI process, a beam selection indicator (BI) and CSI may be reported by the UE. A BI is a wideband parameter representing the index of a particular CSI-RS resource within the K configured CSI-RS resources, and the reported CSI, e.g., CQI/PMI/RI, is measured on the CSI-RS resource which corresponds to the reported BI. The BI may be reported by the UE on PUCCH or PUSCH. When reported on PUCCH, such as PUCCH 2/2a/2b, it may be configured with a periodicity that is an integer multiple of the rank indicator (RI) periodicity or equivalent to the RI periodicity. CSI report types that include BI have a higher priority than CSI types that do not include BI. The BI may be separately reported with other CSI parameters or may be jointly reported with RI. When reported on PUSCH, however, the BI will be reported together with other CSI parameters, such as PMI, CQI, and RI.

Periodic CSI reporting on PUCCH in modes 1-1 and 2-1 can be configured for PMI/RI reporting. For example, mode 1-1 is defined for wideband CQI reporting including two submodes, submode 1 or 2, while mode 2-1 is defined for wideband/subband CQI reporting. Depending on the different antenna ports, the supported mode/submodes may be different for PMI/RI reporting, e.g., 2-ports CSI-RS supports mode 1-1 without submodes and mode 2-1; 4-ports CSI-RS supports all modes, mode 1-1 without submodes, mode 1-1 submode 1, submode 2 and mode 2-1; and 8-ports CSI-RS supports mode 1-1 submode 1, submode 2 and mode 2-1. For CSI reporting with a single CSI-RS resource, e.g., class A or class B with K=1, the UE may be configured for the particular mode/submode through higher layer signaling. For a given mode/submodes and number of antenna ports, CSI reporting types for CSI feedback are, thus, determined.

In PUCCH Mode 1-1 (wideband CQI), a full CSI consists of 2 reports multiplexed in different subframes. The first report, Report 1, which includes CSI types with RI, has a longer reporting periodicity than the second report, Report 2, which includes CSI types with CQI, as shown below in Table 1.

TABLE 1

|  | Report 1 | Report 2 | Comments |
| --- | --- | --- | --- |
| Mode 1-1 w/o submodes | Type 3 (RI only) | Type 2 (PMI/wb CQI) | 2- or 4-port CSI-RS |
| Mode 1-1 Submode 1 | Type 5 (RI/$1^{st}$ PMI) | Type 2b ($2^{nd}$ PMI/wb CQI) | 4- or 8-port CSI-RS |
| Mode 1-1 submode 2 | Type 3 (RI) | Type 2c ($1^{st}$, $2^{nd}$ PMI/wb CQI) | 4- or 8-port CSI-RS |

In PUCCH Mode 2-1 (wideband/subband CQI), a full CSI consists of 3 reports multiplexed in different subframes. The different reports may have different periodicities, e.g., report 1>2>3 and different payload sizes, as shown below in Table 2.

TABLE 2

|  | Report 1 | Report 2 | Report 3 |
| --- | --- | --- | --- |
| 2- or 4-port CSI-RS (no PTI) | Type 3 (RI only) | Type 2 (PMI/wb CQI) | Type 1 (sb CQI) |
| 4- or 8-port CSI-RS (PTI = 0) | Type 6 (RI/PTI = 0) | Type 2a ($1^{st}$ PMI) | Type 2b ($2^{nd}$ PMI/wb CQI) |
| 4- or 8-port CSI-RS (PTI = 1) | Type 6 (RI/PTI = 1) | Type 2b ($2^{nd}$ PMI/wb CQI) | Type 1a ($2^{nd}$ PMI/sb CQI) |

CSI reporting in class B with more than one CSI-RS resource (K>1) may result in CSI reporting type ambiguity. For different antenna ports, the CSI reporting types may be different even with the same reporting mode/submodes. For example, PUCCH mode 2-1, for 2-ports and 8-ports could have different CSI reporting types. A selection of different CSI-RS resources with different $N_k$ for CSI reporting, therefore, may cause potential ambiguity for determining CSI reporting types.

Moreover, RI reporting is conditioned on the selected CSI-RS resource. However, the reported BI indicates the selection of the CSI-RS resource/configuration, in which the number of transmission layers can be 1, 2, . . . , or $N_k$. When BI and RI are not reported simultaneously, a rank ambiguity may arise with selection of different CSI-RS resources having different $N_k$ for CSI reporting. Therefore, an issue may arise as to determining the reference rank for CQI/PMI measurement after BI reporting when the RI was not reported. such as due to a collision with the BI or the reporting instance for RI is not available. Another issue may arise when the last reported RI before the most recent BI reporting is not compatible with the CSI-RS resource corresponding to the most recent BI, e.g., the number of ports, $N_k$, associated with the selected CSI-RS resource is not compatible with the last reported RI. Various aspects of the present disclosure are directed to determining CSI reporting types for heterogeneous CSI-RS resources.

Figure 4:
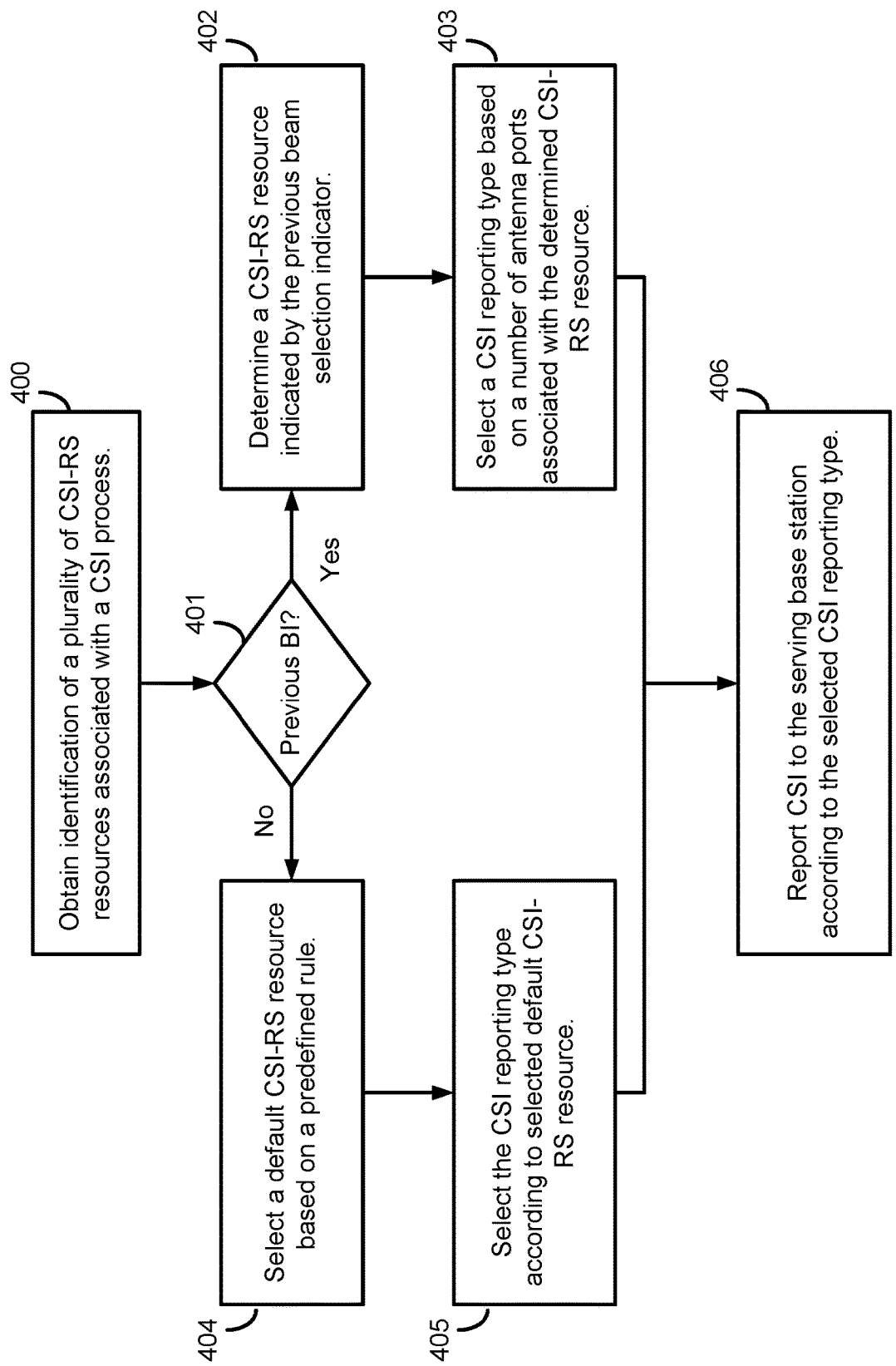
FIG. 4 is a block diagram illustrating example blocks executed to implement one aspect of the present disclosure.

FIG. 4 is a block diagram illustrating example blocks executed to implement one aspect of the present disclosure. FIG. 4 will also be described with respect FIG. 10, which is a block diagram illustrating a UE 1000 configured according to various aspects of the present disclosure. UE 1000, which includes similar features and components as those illustrated with UE 115 (FIG. 2), includes a controller/processor 280, memory 282 in communication with and under control of controller/processor 280, wireless radios 1001*a-r*, and antennas 252*a-r*. Wireless radios 1001*a-r* include multiple components and hardware, such as demodulator/modulators 254*a-r*, MIMO detector 256, receive processor 258, transmit processor 264, and TX MIMO processor 266, each as illustrated in FIG. 2. The features and functionalities of UE 1000 are executed and controlled by controller/processor 280. Memory 282 contains various logic, software, or firmware that, when executed by controller/processor 280 creates the operational environment and processes to implement the various aspects of the present disclosure.

At block 400, a UE, such as UE 1000, obtains identification of a plurality of CSI-RS resources associated with a CSI process. With the number of CSI-RS resources greater than one (K>1), CSI reporting is determined as class B. For example, UE 1000 receives signaling from a serving base station through antennas 252*a-r*, wireless radios 1001*a-r*, which are decoded and processed by controller/processor 280.

At block 401, a determination is made whether a previous BI had been reported by the UE. A UE, such as UE 1000 may executed CSI report type logic 1004 in memory 282 in order to determine whether the previous BI had been reported. If so, then, at block 402, the UE determines the specific CSI-RS resource indicated by the previous BI. The UE, such as UE 1000, in executing CSI report type logic 1004 would identify the previous BI, which identifies the specific CSI-RS resource selected, and further identifies the number of antenna ports, $N_k$, associated with the CSI-RS resource. At block 403, the UE selects a CSI reporting type based on the number of antenna ports, $N_k$, associated with the selected CSI-RS resource. In execution of the CSI report type logic 1004. UE 1000 would determine the CSI reporting types in a periodic reporting mode based on the last reported BI, e.g., based on $N_k$ of the CSI-RS resource indicated by BI.

If, in response to the determination at block 401, it is determined that there was not previous BI, for example, because it was dropped due to a collision with other CSI transmissions, the UE will determine, at block 404, to select a default CSI-RS resource based on a predefined rule. The UE, such as UE 1000, in executing the CSI report type logic 1004, would determine the absence of the previous BI and select the default CSI-RS resource as determined by CSI report type logic 1004. The default CSI-RS resource allows the UE, such as UE 1000, to identify the number of antenna ports associated with the default CSI-RS resource. At block 405, the UE selects the CSI reporting type according to the number of antenna ports, $N_k$, associate with the default CSI-RS resource. The UE, such as UE 1000 executing CSI report type logic 1004, may identify the default CSI-RS resource according to a predefined rule, such as the CSI-RS resource having the lowest resource index in the CSI process, the CSI-RS resource having the highest number of antenna ports associated with it, or the like. Various predefined rules may be used in execution of CSI report type logic 1004 to identify a default CSI-RS resource according to blocks 404 and 405.

Using the selected CSI reporting type, either based on the CSI-RS resource identified by the previous BI, at block 403, or based on the default CSI-RS resource, the UE will conduct CQI/PMI/RI calculation conditioned on the CSI-RS resource. A UE, such as UE 1000, will, under control of controller/processor 280, execute measurement logic 1002 and CSI report generator 1003, stored in memory 282, to generate the CQI/PMI/RI calculations for the CSI report. At block 406, the UE reports the CSI to the serving base station according to the selected CSI reporting type. The UE, such as UE 1000 may then transmit the generated CSI report to the serving base station via wireless radios 1001*a-r* and antennas 252*a-r*.

Figure 5A:
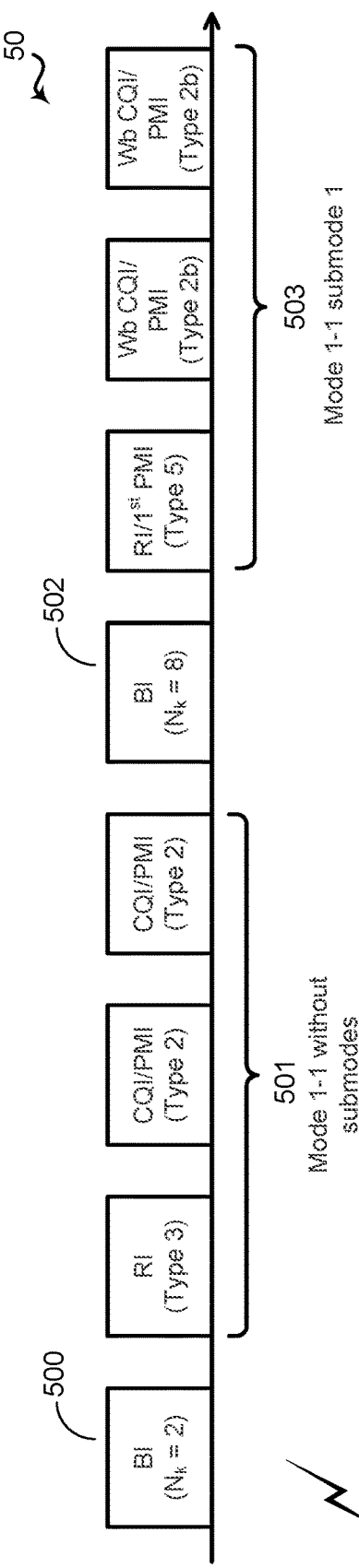
FIGS. 5A and 5B are block diagrams illustrating CSI reporting streams of a UE configured according to aspects of the present disclosure.
Figure 5B:
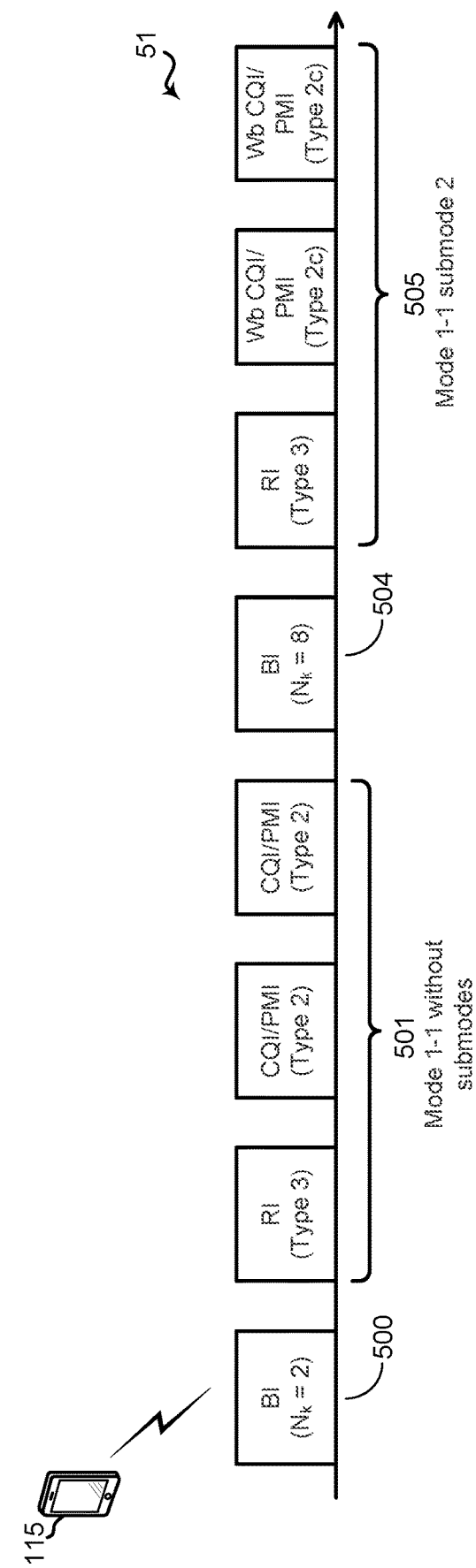

FIGS. 5A and 5B are block diagrams illustrating CSI reporting streams 50 and 51 of a UE 115 configured according to aspects of the present disclosure. When a previous BI is detected to have been reported by UE 115, UE 115 selects the particular CSI reporting type based, at least in part, on the previously reported BI. For example, in PUCCH mode 1-1, UE 115 identifies that a BI was reported at 500 at CSI reporting streams 50 or 51. The previously reported BI indicates selection by UE 115 of a particular CSI-RS resource, which is associated with two antenna ports, $N_k=2$. Based on the BI and the number of antenna ports associated with PUCCH mode 1-1, type 3 RI and type 2 CQI/PMI CSI reports are transmitted at 501 of CSI reporting streams 50 or 51. At a later point, UE 115 identifies that another BI is reported at 502 of CSI reporting stream 50. Based on the BI reported at 502, UE 115 has selected a CSI-RS associated with 8 antenna ports, $N_k=8$. In FIG. 5A, UE 115 has been configured to use submode 1 of PUCCH mode 1-1, and, thus, will transmit CSI report type 5 RI/i1 ($1^{st}$ PMI) and type 2b CQI/i2 ($2^{nd}$ PMI) at 503 of CSI reporting stream 50. Alternatively, as illustrated in FIG. 5B, UE 115 is configured to use submode 2 of PUCCH mode 1-1, which would trigger UE 115 to report CSI report type 3 RI and type 2c CQI/i1/i2.

Additional aspects of the present disclosure are directed to determining a reference rank for heterogeneous CSI-RS resources when BI and RI are reported separately. When BI and RI are separately reported, in the absence of a reported RI after the BI reporting, calculation of CQI/PMI should be conditioned on a default reference rank. The various aspects of the present disclosure may provide alternatives for determining this reference rank.

Figures 6A, 6B:
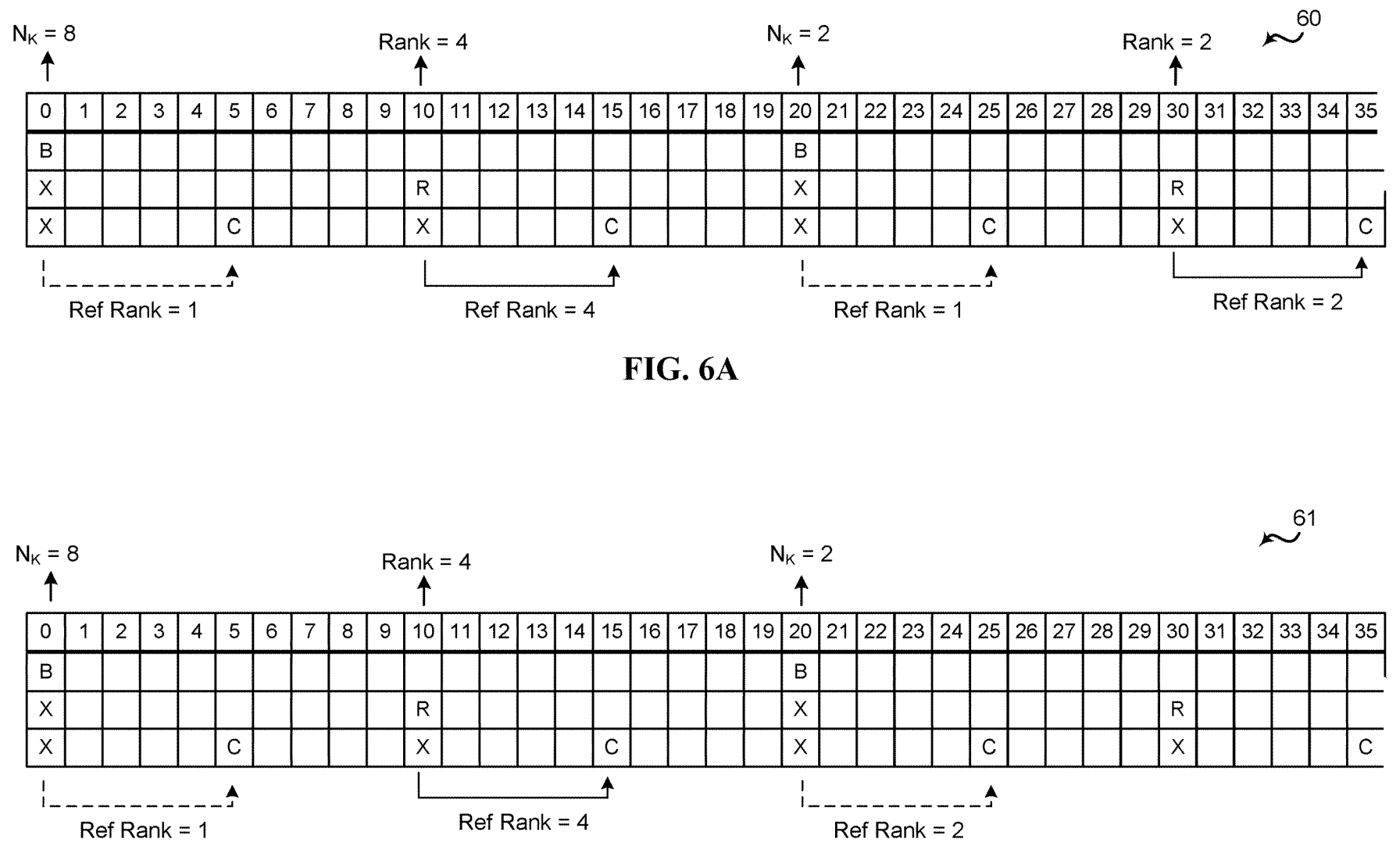
Figure 10:
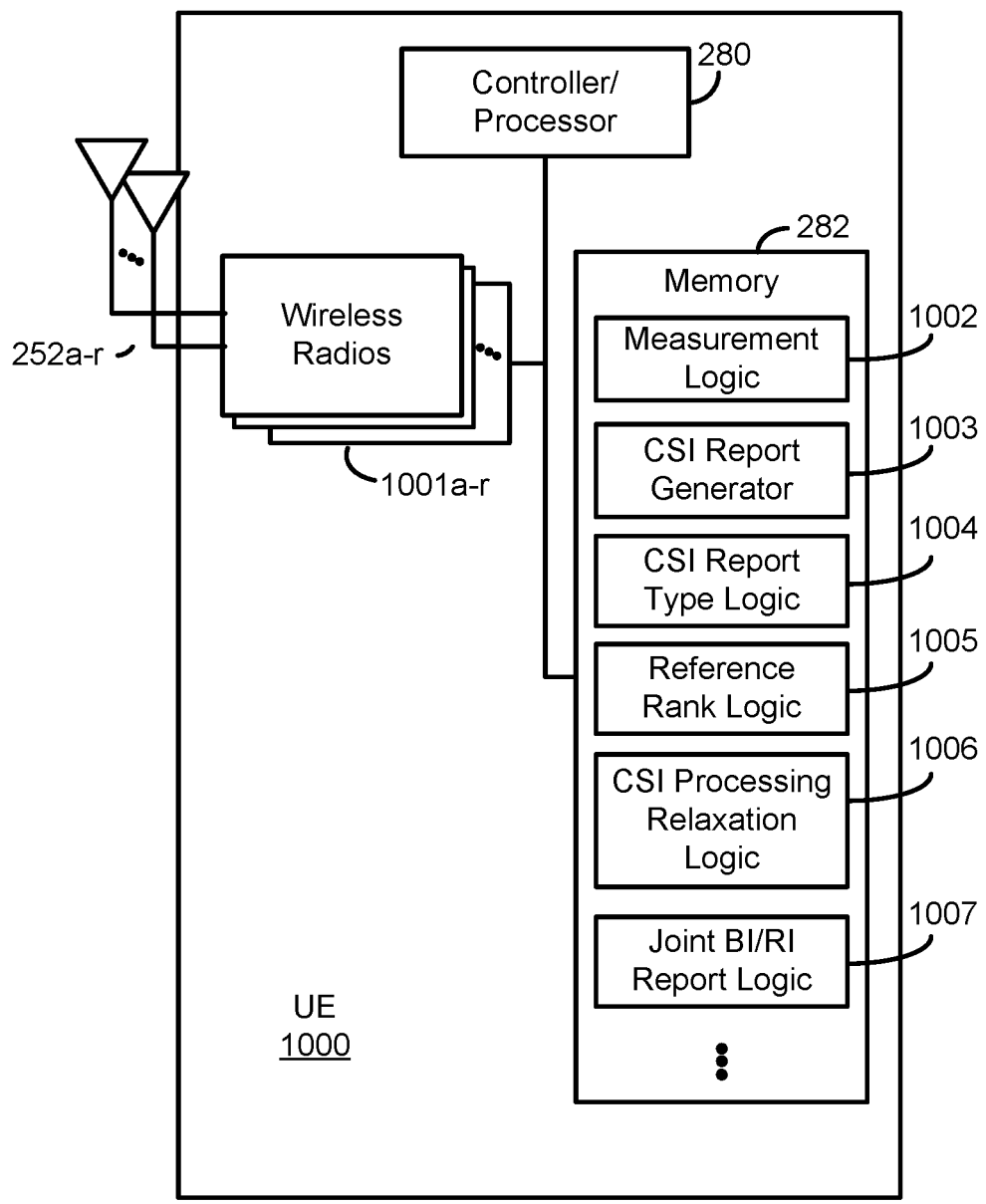
FIG. 10 is a block diagram illustrating a UE configured according to various aspects of the present disclosure.

FIGS. 6A and 6B are block diagrams illustrating CSI reporting streams 60 and 61 from UEs configured according to aspects of the present disclosure. CSI reporting streams 60 and 61 may be used for communication and CSI processing of UE 1000 (FIG. 10). In a first alternative aspect, the default reference rank is selected to correspond to the lowest possible RI available with respect to the CSI-RS resource indicated by the latest BI reporting. Such lowest possible RI would generally be given by the bitmap parameter codebookSubsetRestriction associated with the selected CSI-RS resource and would only be valid for CSI reports of the CSI-RS resource indicated by the last reported BI. A UE, such as UE 1000, would, under control of controller/processor 280, execute reference rank logic 1005, stored in memory 282, in order to determine the reference rank according to the aspects described herein. At subframe 0 of CSI reporting stream 60, a UE, such as UE 1000, reports BI ('B') using wireless radios 1001*a-r* and antennas 252*a-r*, but due to a collision with the BI, does not report RI or CQI/PMI. The reported BI is associated with a CSI-RS resource with 8 antenna ports ($N_k=8$). In order to generate the CQI/PMI for reporting at subframe 5, because no RI was reported at subframe 0, the UE selects a reference rank. The lowest possible RI available for the CSI-RS resource with $N_k=8$ is 1. Thus, when executing reference rank logic 1005, UE 1000 selects a reference RI of 1 to generate the CSI parameters that are reported at subframe 5. The CSI parameters are generated by UE 1000 through execution, under control of controller/processor 280 of measurement logic 1002 and CSI report generator 1003.

At the next RI reporting opportunity at subframe 10, the UE, such as UE 1000, reports an RI of 4, which is associated with the previously reported BI with $N_k=8$. The UE, such as UE 1000, would then use the reported RI of 4 for the reference rank in generating the CQI/PMI for reporting in subframe 15. The CSI measurements of the selected CSI-RS resource as conducted through execution of measurement logic 1002 is conditioned with this reference RI of 4.

Subframe 20 of CSI reporting stream 60 provides the next reporting opportunity for BI from the UE. The new BI reported by the UE, such as UE 1000, identifies a CSI-RS resource with 2 antenna ports, $N_k=2$. Again, because of collision with the BI reporting, the UE does not report either a new RI or CSI parameters. In order for UE 1000 to calculate the CQI/PMI for reporting in subframe 25, reference rank logic 1005 uses the lowest possible rank associated with the selected CSI-RS resource having $N_k=2$, which is 1. Thus, the generated CSI parameters by measurement logic 1002 and CSI report generator 1003 for reporting at subframe 25 are conditioned using a reference RI of 1. When the UE, such as UE 1000, is able to report the new RI of 2 at subframe 30, it may then use the reported RI as the reference rank to generate the CSI parameters for reporting at subframe 35.

In the alternative aspect illustrated in FIG. 6B for determining a default reference rank, execution of reference rank logic 1005 by UE 1000 would provide that the default rank may be determined jointly based on the latest reported RI ($r_k^*$) before the latest BI reporting associated with the $k^{th}$ CSI-RS resource, and the highest possible RI ($r_{k'}$) associated with the $k^{th}$ CSI-RS resource indicated by the latest BI reporting. The default reference rank corresponds to $$RI=r_k^* \text{ if } r_k^*<r_{k'}, \text{ otherwise } RI=r_{k'} \quad (1)$$

Any precoding matrix indicator reported is valid only for CSI reports for that CSI-RS resource indicated by the last reported BI.

Similar to the aspect described with respect to FIG. 6A, at subframe 0 of CSI reporting stream 61 of FIG. 6B, a UE, such as UE 1000, reports BI ('B') via wireless radios 1001a-r and antennas 252a-r, but due to a collision with the BI, does not report RI or CQI/PMI. The reported BI is associated with a CSI-RS resource with 8 antenna ports ($N_k=8$). In order for UE 1000, through execution of measurement logic 1002 and CSI report generator 1003, to generate the CQI/PMI for reporting at subframe 5, because no RI was reported at subframe 0, the UE selects a reference rank. According to the example aspect, the UE, such as UE 1000, would compare, through execution of reference rank logic 1005, the last reported RI prior to the BI reported at subframe 0 with a reference rank of the highest possible RI available for the CSI-RS resource with $N_k=8$. The previously reported RI before subframe 0 (not shown) was 1. Thus, because an RI of 1 is less than RI=4, the highest possible RI available for the CSI-RS resource with $N_k=8$, the UE selects a reference RI of 1 to generate the CSI parameters that are reported at subframe 5.

At subframe 20, during the next opportunity to report BI, the UE, such as UE 1000. reports a BI which identifies a CSI-RS resource having 2 antenna ports, $N_k=2$. However, there is no RI reported with the BI due to collision. Thus, in order to generate the CSI report at subframe 25, the UE compares the last reported RI before the reported BI at subframe 20. which is 4, reported by the UE at subframe 10, with the highest available RI based on the CSI-RS resource having $N_k=2$, as identified by the BI reported at subframe 20, which is 2. Because the previously reported RI is greater than the highest currently available RI considering the latest reported BI, the UE selects the lower RI of 2 for determining the CQI/PMI for reporting at subframe 25.

Reporting of RI and BI may also occur in a single joint report. When BI and RI are jointly reported there may be ambiguity in determining the bit widths for the joint report because the payload size of RI is conditional on $N_k$ of the CSI-RS resource, which is indicated by the BI. Therefore, the bit widths would generally be variable dependent on the content of BI. Various additional aspects of the present disclosure are directed to providing fixed bit widths for the joint RI/BI report for given BI values. The fixed bit widths simplify BI and RI decoding.

Figure 7:
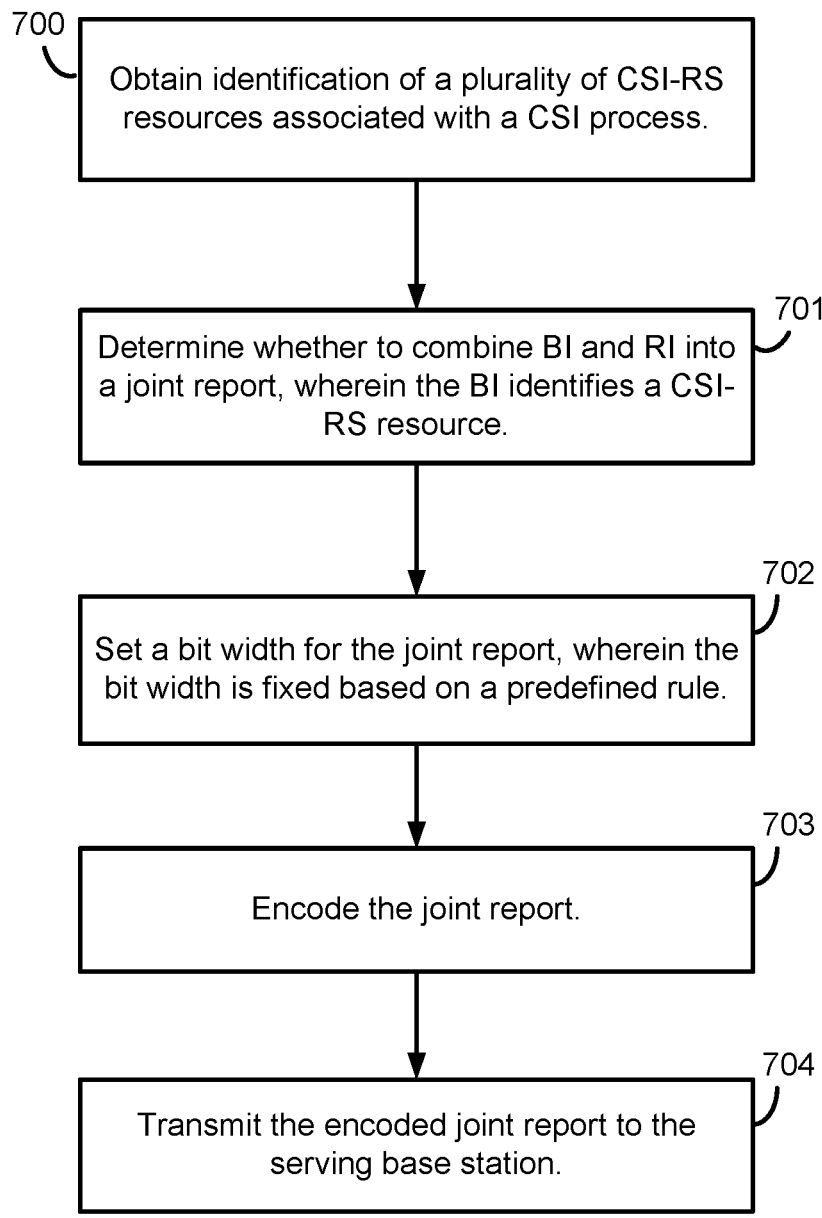
FIG. 7 is a block diagram illustrating example blocks executed to implement one aspect of the present disclosure.

FIG. 7 is a block diagram illustrating example blocks executed to implement one aspect of the present disclosure. The example blocks of FIG. 7 will also be described with respect to the components and hardware of UE 1000, illustrated in FIG. 10. At block 700, a UE obtains identification of a plurality of CSI-RS resources associated with a CSI process. The multiple CSI-RS resources defined per CSI process indicates that UE 1000 is to use a class B CSI reporting class. At block 701, the UE makes a determination whether to combine BI and RI into a joint report, wherein the BI identifies a particular CSI-RS resource selected for CSI reporting. For example the UE, such as UE 1000, under control of controller/processor 280, executes joint BI/RI report logic 1007, stored in memory 282. The execution environment of joint BI/RI report logic 1007 allows UE 1000 to determine whether to combine the BI and RI into a joint report.

At block 702, a bit width is set for the joint report, wherein the bit width is fixed based on a predefined rule. Within the execution environment of joint BI/RI report logic 1007, the UE, such as UE 1000, may determine the fixed bit widths based on a predefined rule within joint BI/RI report logic 1007. In example aspects, execution of the joint BI/RI report logic 1007 may determine the fixed bit widths for the RI based on the maximum number of antenna ports configured across all of the CSI-RS resources and the number of layers supported by the UE, while the fixed bit width for the BI, which may be concatenated with the RI, may be determined based on the number of CSI-RS resources configured. At block 703, the UE encodes the joint report, and, at block 704, transmits the encoded joint report to the serving base station. The UE, such as UE 1000, may encode the joint report through execution of joint BI/RI report logic 1007, which, under control of controller/processor 280, would encode the joint report for transmission via wireless radios 1001a-r and antennas 252a-r.

In one aspect for determining the fixed bit widths based on a predefined rule, the number of bits for the RI report is determined within execution of joint BI/RI report logic 1007 according to the equation:

$$\#\text{bits for } RI=\log_2(\min(\max(N_k),N_{layer})) \quad (2)$$

where $\max(N_k)$ is the maximum number of antenna ports configured across all of the CSI-RS resource, and $N_{layer}$ is the maximum number of layers supported by UE. The number of bits for the BI report is determined according to the equation:

$$\#\text{bits for } BI=\text{ceil}(\log_2(K)) \quad (3)$$

where K is the total number of CSI-RS resources configured for CSI reporting.

In additional aspects of the present disclosure that provide for joint BI/RI reporting, the joint report may be transmitted on PUSCH. For BI mapping onto PUSCH, when joint coding of RI and BI is used, the total payload size can be up to 25 bits, as a result of the aggregation of BI/RI bits according to multiple CSI processes and multiple downlink cells. For example, when $N_{total}$=32, the joint BI/RI per CC is $\log_2(N_{total})$=5 bits, which accounts for 5 downlink CCs or CSI processes. Currently, the bit widths for RI feedback on PUSCH for multiple CCs is limited to 3×5=15 bits. Channel coding for the RI is based on the block coding with total payload size O≤21. Therefore, when the total bit widths for RI feedback on PUSCH is more than 21 bit, a different channel coding and coding offset values may be considered. If O≤21, block coding can be used. If O>21, a convolutional coding, such as tail biting convolutional code (TBCC), may be used. An additional $\beta_{offset}^{RI}$ may be configured for TBCC in additional to the one used for the block coding.

Additional aspects of the present disclosure are related to CSI feedback processing relaxation. For coordinated multi-point (CoMP) with multiple CSI processes, relaxation of the CSI feedback processing timeline may be allowed to alleviate computation complexity. For a given serving cell, a UE is not expected to receive one CSI trigger to update the CSI for more than $N_{CSI-P}$ CSI processes, where the allowed values of $N_{CSI-P}$ include {1, 3, 4} based on UE capability. When the number of unreported CSI requests exceeds a threshold ($N_x < N_u$), the additional CSI requests over the threshold are allowed to be based on outdated measurement information. In FDD systems, $N_x = N_{CSI-P}$ and $N_u$ is the number of unreported CSI processes which are counted till the current CSI triggering subframe. The relaxation rule may be applied independently per serving cell (CC) and no relaxation is allowed when only a single CSI process is configured for the serving cell. Timeline relaxation may also be applied, for example, in which a CSI reference resource is delayed by an additional subframe compared to the CSI request subframe. For FD-MIMO, with the introduction of 12 and 16 CSI-RS ports with separate configuration of CSI-RS resources for different CSI processes, CSI processing complexity relaxation may be redesigned.

Figure 8:
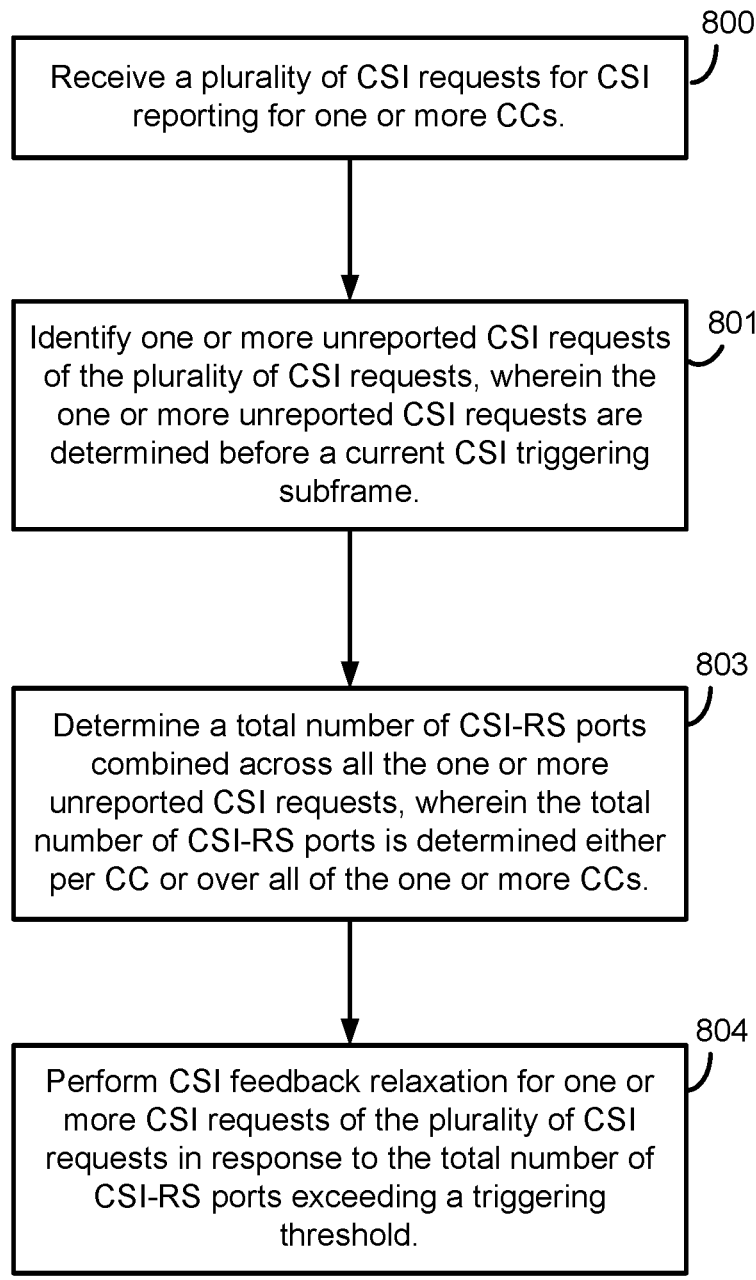
FIG. 8 is a block diagram illustrating example blocks executed to implement one aspect of the present disclosure.

FIG. 8 is a block diagram illustrating example blocks executed to implement one aspect of the present disclosure. The example blocks of FIG. 8 will also be described with respect to the components and hardware of UE 1000, illustrated in FIG. 10. At block 800, a UE receives a plurality of CSI requests for CSI reporting for one or more CCs. The UE, such as UE 1000, receives CSI requests from its serving cell via antennas 252*a-r* and wireless radios 1001*a-r*. The CSI requests may relate to different CCs and different CSI-RS processes configured for CSI feedback.

At block 802, the UE identifies one or more one or more unreported CSI requests of the plurality of CSI requests, wherein the one or more unreported CSI requests are determined before a current CSI triggering subframe. The UE, such as UE 1000, executes CSI processing relaxation logic 1006, stored in memory 282, under control of controller/processor 280 in order to identify the unreported CSI requests. The unreported CSI requests are the requests that the UE has not responded to with CSI reports prior to the current CSI triggering frame.

At block 803, the UE determines a total number of CSI-RS antenna ports combined across all of the unreported CSI requests, wherein the total number of CSI-RS antenna ports is determined either per CC or over all of the CCs. The UE, such as UE 1000 executing CSI processing relaxation logic 1006 determines the total number of CSI-RS antenna ports. The total number of CSI-RS antenna ports for the unreported CSI requests are related to the maximum number of CSI-RS antenna ports associated with the UE for CSI processes. The maximum number of such CSI-RS antenna ports will be considered a triggering budget or threshold.

At block 804, the UE will perform CSI feedback relaxation for one or more of the CSI requests of the plurality of CSI requests in response to the total number of CSI-RS antenna ports for the unreported CSI requests exceeding a triggering threshold. Through execution of CSI processing relaxation logic 1006, UE 1000 compares the total number of CSI-RS antenna ports to the triggering budget or threshold before applying CSI feedback relaxation. The CSI feedback relaxation may include both allowing the additional unreported CSI requests to be based on outdated measurement information or by delaying the timing of CSI reports by a predetermined number of subframes.

Figure 9A:
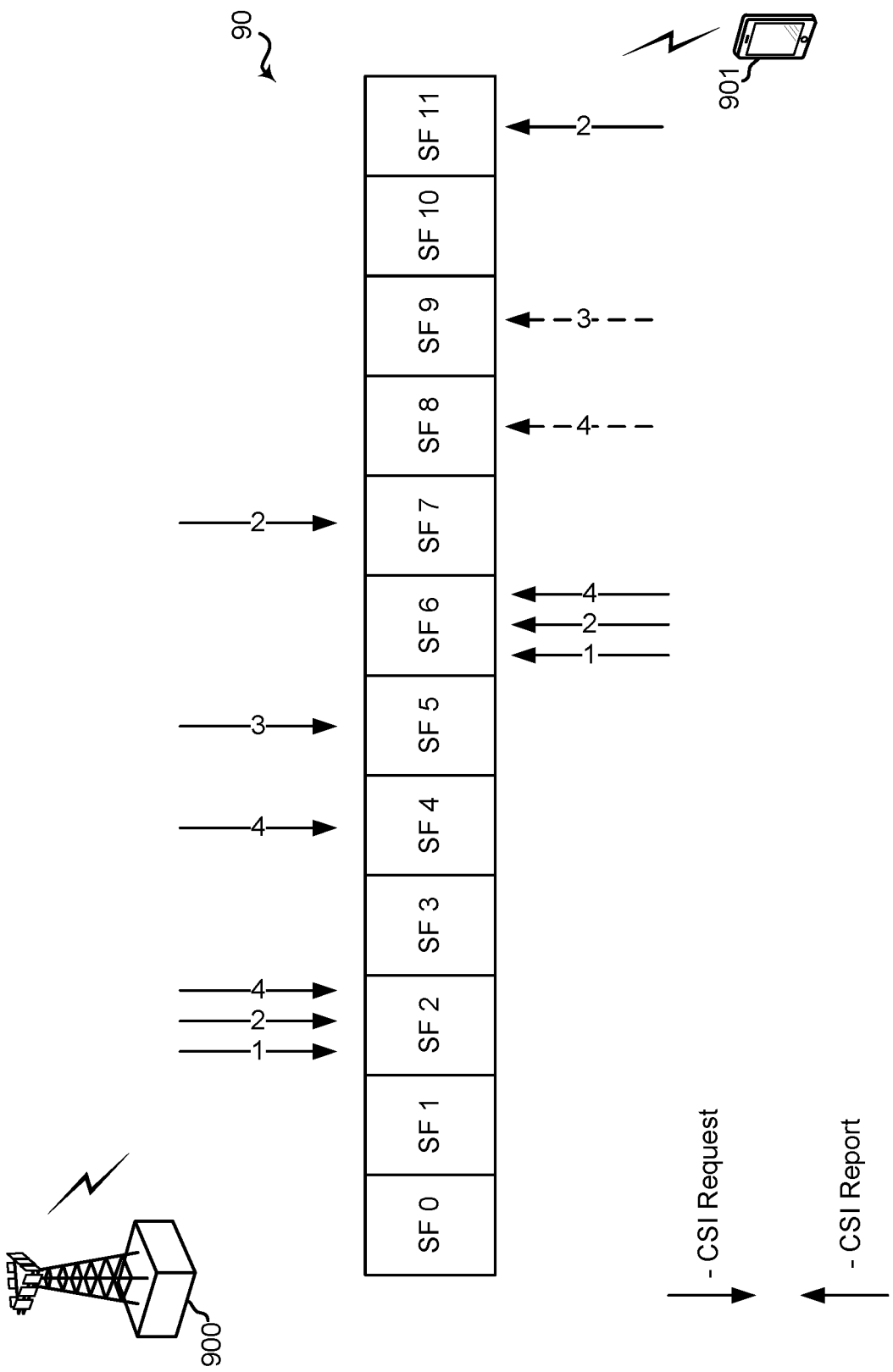
FIGS. 9A-9C are block diagrams illustrating example aspects of CSI feedback relaxation by a UE configured according to aspects of the present disclosure.

FIG. 9A is a block diagram illustrating a first example aspect of CSI feedback relaxation by a UE 901 configured according to one aspect of the present disclosure. Transmission stream 90 illustrates twelve subframes (SF 0-SF 11) of communications between serving base station 900 and UE 901. As illustrated in FIG. 9A. CSI feedback processing relaxation depends on the total number of CSI-RS ports combined across all CSI-RS processes per CC. The allowed values for the CSI-RS ports, $N_{CSI-RS-Port}$, are {16, 32, 64}, based on UE capability. For purposes of the example illustrated at FIG. 9A. $N_{CSI-RS-Port}$=32. Moreover, there are four CSI processes configured for CSI feedback, CSI processes #1 (K=1. $N_k$=16), CSI process #2 (K=1, $N_k$=8). CSI process #3 (K=2, $N_k$=8), and CSI process #4 (K=1, $N_k$=8). The maximum total number of CSI-RS ports of CSI-RS resources associated with all the configured CSI processes per CC will be no more than $N_{CSI-RS-Port}$. Moreover, no relaxation will be triggered when the total number of CSI-RS ports across all the configured CSI processes for the serving cell is 8 or less.

For one CSI trigger, if the number of CSI-RS ports across all the unreported CSI requests exceeds a triggering budget or threshold, determined by ($N_{x-ports} < N_{u-ports}$), then the additional CSI requests are allowed to be based on outdated measurements. For FDD, $N_{x-ports}=N_{CSI-RS-Port}$ and $N_{u-ports}$ is the number CSI-RS ports combined across the unreported CSI processes for the serving cell counted before the CSI triggering subframes. The CSI processes associated with the additional CSI requests are ordered according to the CSI process index and only the lowest-indexed $N_p$ CSI processes with a total number of CSI-RS ports less than the triggering budget can be reported with accurate CSI.

Referring back to FIG. 9A, at subframe 2, base station 900 sends three CSI requests for CSI process #1, CSI process #2, and CSI process #4. Considering the total number of CSI-RS ports combined across the unreported CSI processes (e.g., CSI processes #1, #2. and #4, 16+8+8), and the triggering budget or threshold $N_{CSI-RS-Port}$=32, the CSI requests for CSI processes #1, #2, and #4 fall within the triggering budget, UE 901 may accurately measure and report CSI for those requests. At subframe 4, base station 900 transmits another CSI request for CSI process #4. The number of CSI-RS ports of the unreported CSI process is added by 8 antenna ports from CSI process #4. Similarly, the CSI request at subframe 5 for CSI process #3 adds 16 more antenna ports to the number of unreported CSI processes. Thus, at subframe 4 the triggering budget is exceeded with the two CSI requests for CSI processes #4 and #3 being considered for relaxation with an allowance to be based on inaccurate measurement information in the CSI responses transmitted by UE 901 at subframes 8 and 9, respectively. Further at subframe 6, UE 901 transmits accurate CSI reports for CSI processes #1, #2, and #4 to base station 900.

At subframe 7, base station 900 transmits a CSI request for CSI process #2. At that time the total number of CSI-RS ports across all unreported CSI processes is 32 (8+16+8) across the CSI process #4, #3 and #2, which is no larger than the triggering budget or threshold. Thus, the corresponding CSI report for CSI process #2 transmitted by UE 901 will be accurate. At subframe 8 and subframe 9, respectively, UE 901 transmits inaccurate CSI reports for CSI processes #4 and #3.

In an alternative aspects for providing CSI feedback processing relaxation, the determination of whether to implement the relaxation depends on the total number of CSI-RS resources combined across all CCs and all CSI processes. In such aspects, the allowed values of $N_{CSI-RS-res}$ are {1, 3, 4, 8, 24, 32} based on UE capability. All CSI-RS resources are equally complicated irrespective of number of antenna ports. Therefore, the total number of CSI-RS resources across all CSI processes associated with one aperiodic CSI request trigger is no more than $N_{CSI-RS-res}$. Timeline relaxation may apply independently for each serving cell, with no relaxation allowed when the total number of CSI-RS resources across all the configured CSI processes for the serving cell is equal to one. For one CSI trigger, if the number of CSI-RS resources across all the unreported CSI requests exceeds a triggering budget ($N_x<N_u$), additional CSI requests are allowed to be based on outdated measurements. For FDD, $N_x=N_{CSI-RS-res}$ and $N_u$ is the number CSI-RS resources combined across the unreported CSI processes of all CCs which are counted until the CSI triggering subframes. The CSI processes associated with additional CSI requests are first ordered according to CC index and then CSI process index resulting in only the lowest-indexed $N_p$ CSI processes with a total number CSI-RS resources less than the triggering budget can be reported with accurate CSI.

Figure 9B:
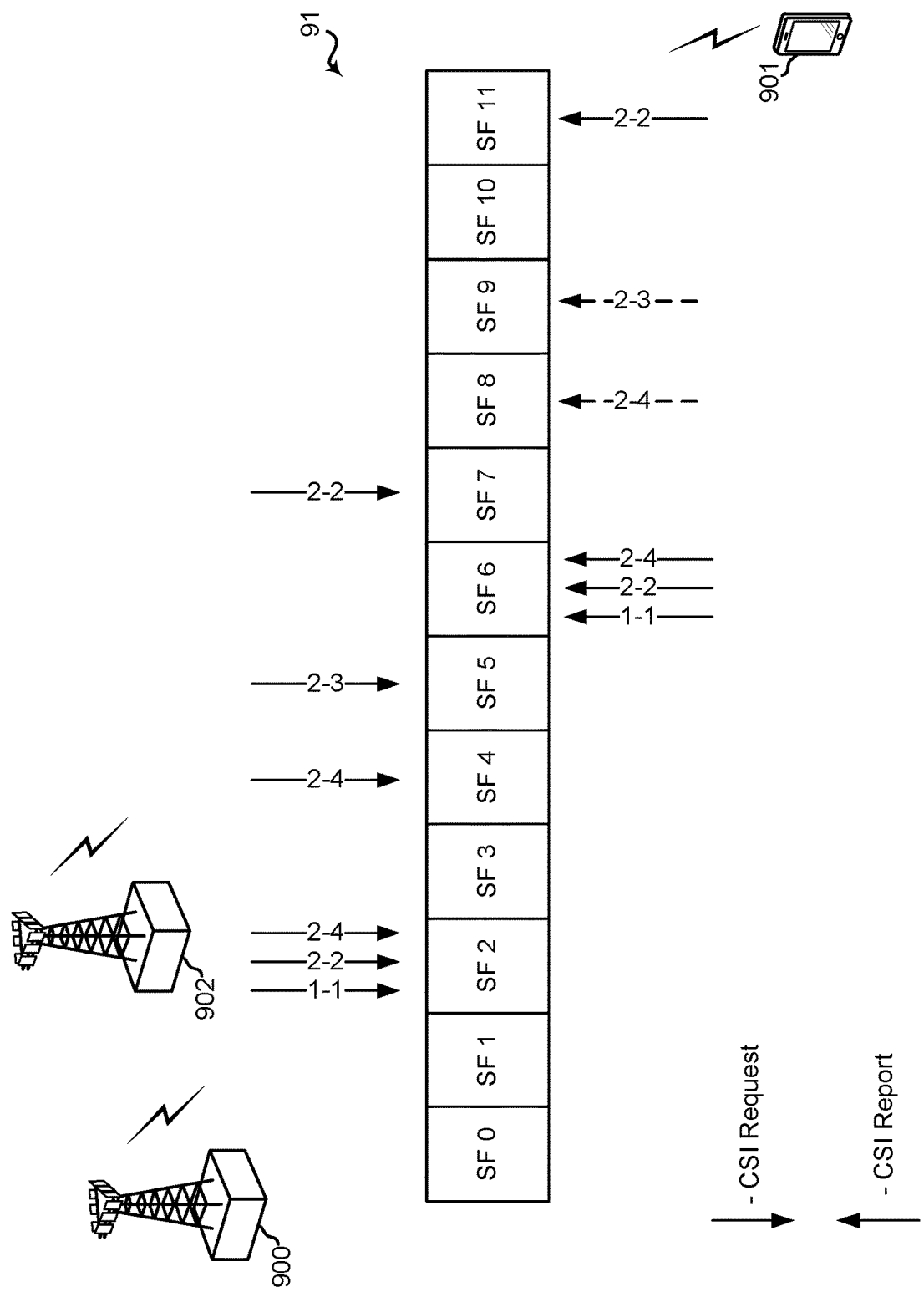

FIG. 9B is a block diagram illustrating a first example aspect of CSI feedback relaxation by a UE 901 configured according to one aspect of the present disclosure. Transmission stream 91 illustrates twelve subframes (SF 0-SF 11) of communications between serving base stations 900 and 902 and UE 901. For purposes of the aspect illustrated in FIG. 9B, the total number of CSI-RS resources across all CSI processes, $N_{CSI-RS-res}$, is 8. Four CSI processes are configured across two separate CCs, with base stations 900 and 902 transmitting the CSI requests to UE 901 for CSI process #1 (CC#1-base station 900, K=2), CSI process #2 (CC#2-base station 902, K=2), CSI process #3 (CC#2-base station 902, K=1), and CSI process #4 (CC#2-base station 902, K=4).

At subframe 2, base station 900 transmits a CSI request for CSI process #1, and base station 902 transmits CSI requests for CSI processes #2 and #4. The triggering budget of 8 resources ($N_{CSI-RS-res}$, is 8) is, therefore, accommodated by the three CSI requests from base stations 900 and 902, and the count of unreported CSI processes becomes 3 and the associated total number of CSI-RS resources is $N_u$=2+2+4. At subframes 4 and 5, base station 902 transmits additional CSI requests for CSI processes #4 and #3. Including the additional CSI-RS resources, $N_u$ is increased to 2+2+4+4+1=13 exceeding the triggering budget or threshold. Because the CSI requests for CSI processes #4 and #3 occur in excess of the triggering budget, UE 901 considers these request invalid triggers. At subframe 6, UE 901 transmits accurate CSI reports for CSI processes #1, #2, and #4. Because the CSI requests for these reports occurred within the triggering budget or threshold for UE 901, these reports are based on accurate CSI measurement information. At subframe 7, base station 902 transmits a CSI request for CSI process #2. After reporting the CSI processes #1, #2, and #4, the unreported CSI processes is reduced with only CSI processes #4, #3 and #2 and $N_u$ is reduced to 4+1+2=7<$N_{CSI-RS-res}$, which means that UE 901 will consider the CSI request for CSI process #2 a valid trigger. In subframes 8 and 9, the transmission of CSI reports for CSI processes #4 and #3 are based on inaccurate CSI measurement information according to the relaxation process when receiving the requests for these reports while exceeding the triggering budget or threshold. At subframe 11, UE 901 reports the accurate CSI report for CSI process #2 to base station 902. Because the CSI request for the CSI process #2 arrived at UE 901 when triggering budget was available, UE 901 was able to use accurate CSI measurement information when determining the CSI report transmitted to base station 902 in subframe 11.

In alternative aspects of the present disclosure, activation of the CSI feedback processing relaxation depends on the total number of CSI-RS ports combined across all CCs and all CSI-RS processes. In such aspects, the allowed values of $N_{CSI-RS-Port}$ are {16, 32, 64, 128, 512}, based on UE capability. The maximum total number of CSI-RS ports across all CSI processes associated with one aperiodic CSI request trigger would be no more than $N_{CSI-RS-Port}$. Timeline relaxation may apply independently for each serving cell, but no relaxation is implemented when the total number of CSI-RS ports across all the configured CSI processes for the serving cell is no more than 8. For one CSI trigger, if the number of CSI-RS ports across all the unreported CSI requests exceeds a triggering budget ($N_{x-ports}<N_{u-ports}$), relaxation is activated for additional CSI requests which are allowed to be based on outdated measurements. For FDD, $N_{x-ports}=N_{CSI-RS-Port}$ and $N_{u-ports}$ is the number CSI-RS ports combined across the unreported CSI processes of all CCs which are counted until the CSI triggering subframes. The CSI processes associated with the additional CSI requests are ordered according to the CSI process index and only the lowest-indexed $N_p$ CSI processes with a total number of CSI-RS ports less than the triggering budget can be reported with accurate CSI.

Figure 9C:
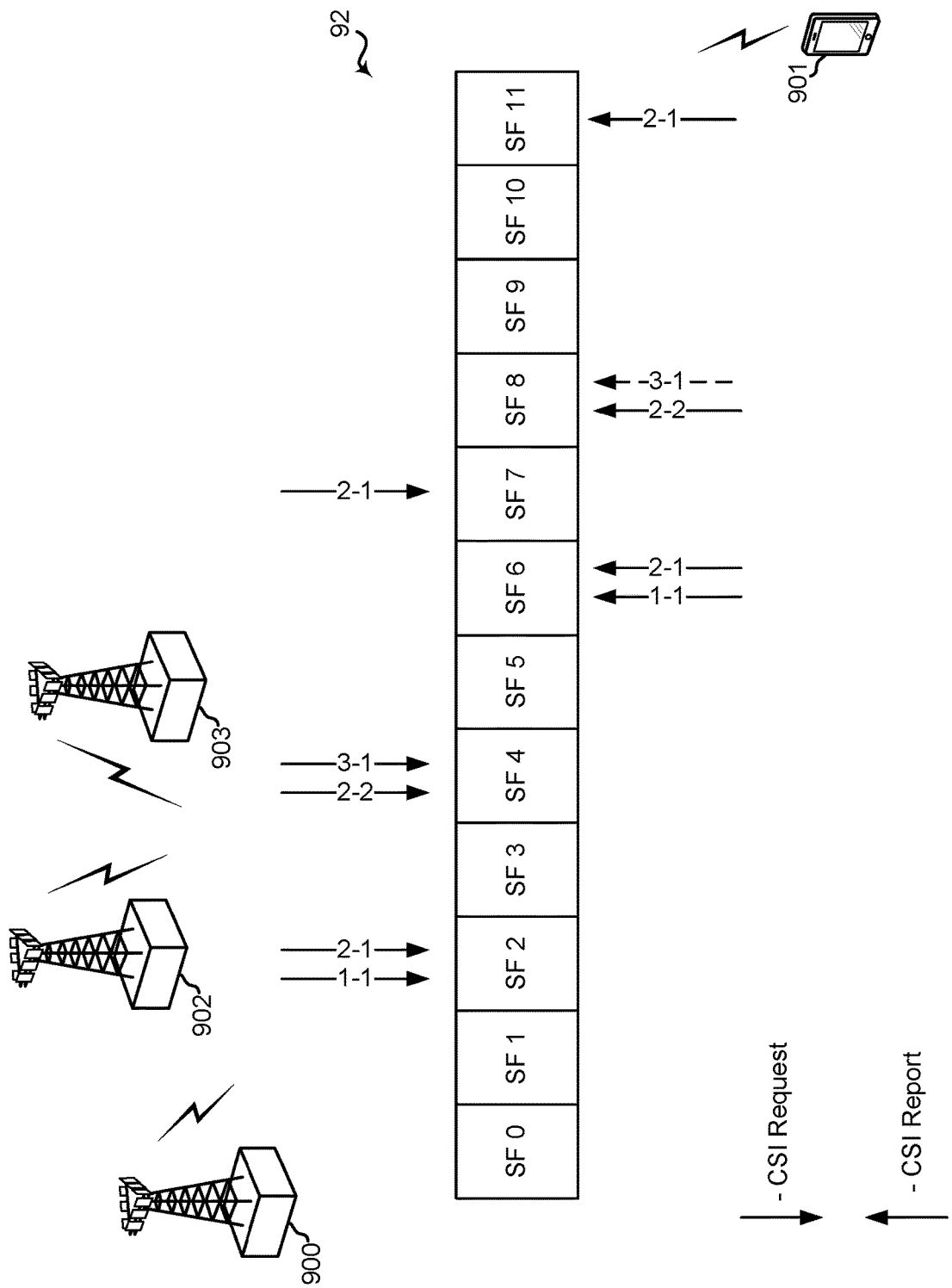

FIG. 9C is a block diagram illustrating a first example aspect of CSI feedback relaxation by a UE 901 configured according to one aspect of the present disclosure. Transmission stream 92 illustrates twelve subframes (SF 0-SF 11) of communications between serving base stations 900, 902, and 903 and UE 901. For purposes of the aspect illustrated in FIG. 9C, the total number of CSI-RS ports across all CCs and all CSI processes. $N_{CSI-RS-port}$, is 32. Four CSI processes are configured across three separate CCs, with base stations 900, 902, and 903 transmitting the CSI requests to UE 901 for CSI process #1-1 (CC#1-base station 900, K=1, $N_k$=16), CSI process #2-1 (CC#2-base station 902, K=1, $N_k$=8), CSI process #2-2 (CC#2-base station 902, K=1, $N_k$=8), and CSI process #3-1 (CC#3-base station 903, K=2, $N_k$=8).

At subframe 2, base stations 900 and 902 transmit CSI requests for CSI processes #1-1 and #2-1 to UE 901. UE 901 determines the total number of CSI-RS ports associated with CSI processes #1-1 and #2-1 ($N_u$=16+8) and compare it with the triggering budget, $N_{CSI-RS-port}$=32. At subframe 4, base stations 902 and 903 transmit CSI requests for CSI processes #2-2 and #3-1 to UE 901. At subframe 4, the total number of CSI-RS ports of the unreported CSI processes is increased to $N_u$=16+8+8+8 and larger than the triggering budget or threshold. UE 901 identifies the CSI requests for CSI process #2-2 as a valid request, while the CSI request for CSI process #3-1 from base station 903 is identified as invalid, as, based on the prioritization, it is considered after the triggering budget or threshold has been exceeded.

At subframe 6, UE 901 transmits accurate CSI reports for CSI processes #1-1 and #2-1. The number of CSI-RS ports of the unreported CSI processes is reduced when the CSI reports for CSI processes #1-1 and #2-1 are transmitted by UE 901. At subframe 7, base station 902 transmits another CSI request for CSI process #2-1. Because UE 901 and the request for CSI process #2-1 are within the triggering budget or threshold, UE 901 identifies the CSI request as a valid request that will be based on accurate CSI measurement information. At subframe 8, UE 901 transmits the accurate CSI report for CSI process #2-2 and the inaccurate CSI report for CSI process #3-1. Finally, at subframe 11, UE 901 transmits the accurate CSI report for the CSI process #2-1 according to the request received from base station 902 at subframe 7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

The present disclosure comprises a first aspect, such as a non-transitory computer-readable medium having program code recorded thereon, the program code comprising:

program code for causing a computer to obtain identification of a plurality of channel state information—reference signals (CSI-RS) resources associated with a CSI process;

program code for causing the computer to determine whether a previous beam selection indicator was reported to the serving base station in a last beam selection indicator reporting opportunity;

program code, executable in response to determining the previous beam selection indicator was reported:
  to determine a CSI-RS resource of the plurality of CSI-RS resources indicated by the previous beam selection indicator; and
  to select a channel state information (CSI) reporting type based on a number of antenna ports associated with the determined CSI-RS resource; and program code for causing the computer to report CSI to the serving base station according to the selected CSI reporting type.

Based on the first aspect, the non-transitory computer-readable medium of a second aspect, further including program code, executable in response to determining the previous beam selection indicator was not reported to the serving base station:
  to select a default CSI-RS resource of the plurality of CSI-RS resources based on a predefined rule; and
  to select the CSI reporting type according to selected default CSI-RS resource.

Based on the second aspect, the non-transitory computer-readable medium of a third aspect, wherein the predefined rule includes program code for causing the computer to one of:
  determine one of the plurality of CSI-RS resources having a lowest resource index in a CSI process; or
  determine one of the plurality of CSI-RS resources having a maximum antenna port.

Based on the first aspect, the non-transitory computer-readable medium of a fourth aspect, further including:
  program code for causing the computer to determine whether a rank indicator was reported after reporting of the previous beam selection indicator;
  program code, executable in response to determining the absence of a rank indicator:
    for causing the computer to identify a default reference rank; and
    for causing the computer to measure the CSI of the CSI-RS resource conditioned on the identified default reference rank.

Based on the fourth aspect, the non-transitory computer-readable medium of a fifth aspect, wherein the program code for causing the computer to identify the default reference rank includes:
  program code for causing the computer to determine a number of antenna ports associated with the CSI-RS resource identified by a last reported beam selection indicator;
  program code for causing the computer to identify a lowest possible rank indicator associated with the number of antenna ports, wherein the default reference rank is the lowest possible rank indicator.

A sixth aspect of the non-transitory computer-readable medium of any combination of the first through fifth aspects.

The present disclosure comprises a seventh aspect, such as a non-transitory computer-readable medium having program code recorded thereon, the program code comprising:
  program code for causing a computer to obtain identification of a plurality of channel state information—reference signals (CSI-RS) resources associated with a CSI process;
  program code for causing the computer to determine whether to combine a beam selection indicator and a rank indicator into a joint report for reporting to the serving base station, wherein the beam selection indicator identifies a CSI-RS resource of the plurality of CSI-RS resources;
  program code for causing the computer to set a bit width for the joint report, wherein the bit width is fixed;
  program code for causing the computer to encode the joint report; and
  program code for causing the computer to transmit the encoded joint report to the serving base station.

Based on the seventh aspect, the non-transitory computer-readable medium of an eighth aspect, wherein the program code for causing the computer to set the bit width includes:
  program code for causing the computer to determine a rank indicator bit width according to:

$$\text{rank indicator bit width} = \log_2(\min(\max(N_L), N_{layer})),$$

where $N_{layer}$ is a maximum number of layers supported by a user equipment (UE) served by the serving base station and N is a number of antenna ports associated with a $k^{th}$ CSI-RS resource of the plurality of CSI-RS resources;
  program code for causing the computer to determine a beam selection indicator bit width according to:

$$\text{beam selection indicator bit width} = \text{ceil}(\log_2(K)).$$

where K is a number of the plurality of CSI-RS resources; and
  program code for causing the computer to concatenate the beam selection indicator of the beam selection indicator bit width with the rank indicator of the rank bit width into the joint report.

Based on the seventh aspect, the non-transitory computer-readable medium of a ninth aspect, wherein the program code for causing the computer to transmit the encoded joint report includes program code for causing the computer to transmit the encoded joint report on an uplink shared data channel, the non-transitory computer-readable medium further including configuration of the at least one processor:

program code for causing the computer to receive an aperiodic CSI triggering for CSI reporting for a plurality of CSI processes and a plurality of downlink cells:

program code for causing the computer to concatenate the encoded joint report of the rank indicator across the plurality of CSI processes and the plurality of downlink cells;

program code for causing the computer to determine a total payload size for the rank indicator of the aggregated encoded joint report;

program code for causing the computer to channel code for the rank indicator using one of:
 a block code when the total payload size is less than or equal to a threshold value; or
 a convolution code when the total payload size exceeds the threshold value.

Based on the ninth aspect, the non-transitory computer-readable medium of a tenth aspect, wherein the program code for causing the computer to channel code further includes program code for causing the computer to channel code the rank indicator of the aggregated encoded joint report using one of:
 a first coding offset parameter when the total payload size is less than or equal to the threshold value; or
 a second coding offset parameter when the total payload size exceeds the threshold value.

An eleventh aspect of the non-transitory computer-readable medium of any combination of the seventh through tenth aspects.

The present disclosure comprises a twelfth aspect, such as a non-transitory computer-readable medium having program code recorded thereon, the program code comprising:

program code for causing a computer to receive a plurality of channel state information (CSI) requests for CSI reporting for one or more component carriers (CCs);

program code for causing the computer to identify one or more unreported CSI requests of the plurality of CSI requests, wherein the one or more unreported CSI requests are determined before a current CSI triggering subframe;

program code for causing the computer to determine a total number of channel state information—reference signal (CSI-RS) ports combined across all the one or more unreported CSI requests, wherein the total number of CSI-RS ports is determined on one of: per CC or over all of the one or more CCs; and program code for causing the computer to perform CSI feedback relaxation for one or more CSI requests of the plurality of CSI requests in response to the total number of CSI-RS ports exceeding a triggering threshold.

Based on the twelfth aspect, the non-transitory computer-readable medium of a thirteenth aspect, wherein the program code for causing the computer to perform the CSI feedback relaxation includes program code for causing the computer to report CSI based on outdated CSI measurements for the one or more CSI requests.

Based on the twelfth aspect, the non-transitory computer-readable medium of a fourteenth aspect, wherein the triggering threshold is determined by a total number of CSI-RS ports supported by UE capability.

Based on the thirteenth aspect, the non-transitory computer-readable medium of a fifteenth aspect further including:

program code for causing the computer to order the plurality of CSI requests according to component carrier index;

program code for causing the computer to further order the plurality of CSI requests according to an index of a CSI process for the same component carrier, wherein the identified one or more CSI requests for CSI feedback relaxation are identified over the ordered plurality of CSI requests.

A sixteenth aspect of the non-transitory computer-readable medium of any combination of the twelfth through fifteenth aspects.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B. and/or C. the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   obtaining identification of a plurality of channel state information-reference signals (CSI-RS) resources associated with a CSI process;
   determining whether a previous beam selection indicator was reported to a serving base station in a last beam selection indicator reporting opportunity;
   in response to determining the previous beam selection indicator was reported:
   determining a CSI-RS resource of the plurality of CSI-RS resources indicated by the previous beam selection indicator; and
   selecting a channel state information (CSI) reporting type based on a number of antenna ports associated with the determined CSI-RS resource;
   in response to determining the previous beam selection indicator was not reported:
   selecting a default CSI-RS resource of the plurality of CSI-RS resources based on a predefined rule; and
   selecting the CSI reporting type according to the selected default CSI-RS resource; and
   reporting CSI to the serving base station according to the selected CSI reporting type.

2. The method of claim 1, wherein the predefined rule includes one of:
   determining one of the plurality of CSI-RS resources having a lowest resource index in the CSI process; or
   determining one of the plurality of CSI-RS resources having a maximum antenna port.

3. The method of claim 1, further including:
   determining whether a rank indicator was reported after reporting of the previous beam selection indicator;
   in response to determining an absence of the rank indicator:
   identifying a default reference rank; and
   measuring the CSI of the CSI-RS resource conditioned on the identified default reference rank.

4. The method of claim 3, wherein the identifying the default reference rank includes:
   determining a number of antenna ports associated with the CSI-RS resource identified by a last reported beam selection indicator;
   identifying a lowest possible rank indicator associated with the number of antenna ports, wherein the default reference rank is the lowest possible rank indicator.

5. A method of wireless communication, comprising:
   obtaining identification of a plurality of channel state information-reference signals (CSI-RS) resources associated with a CST process;
   determining whether to combine a beam selection indicator and a rank indicator into a joint report for reporting to a serving base station, wherein the beam selection indicator identifies a CSI-RS resource of the plurality of CSI-RS resources;
   setting a bit width for the joint report, wherein the bit width is fixed;
   encoding the joint report; and
   transmitting the encoded joint report to the serving base station.

6. The method of claim 5, wherein the setting the bit width includes:
   determining a rank indicator bit width according to:

rank indicator bit width=$\log_2(\min(\max(N_k), N_{layer}))$, where $N_{layer}$ is a maximum number of layers supported by a user equipment (UE) served by the serving base station and $N_k$ is a number of antenna ports associated with a $k^{th}$ CSI-RS resource of the plurality of CSI-RS resources;
   determining a beam selection indicator bit width according to:

beam selection indicator bit width=$\text{ceil}(\log_2(K))$, where K is a number of the plurality of CSI-RS resources; and concatenating the beam selection indicator of the beam selection indicator bit width with the rank indicator of the rank bit width into the joint report.

7. The method of claim 5, wherein the transmitting the encoded joint report includes transmitting the encoded joint report on an uplink shared data channel, the method further including:

receiving an aperiodic CSI triggering for CSI reporting for a plurality of CSI processes and a plurality of downlink cells;

concatenating the encoded joint report of the rank indicator across the plurality of CSI processes and the plurality of downlink cells;

determining a total payload size for the rank indicator of the aggregated encoded joint report;

channel coding for the rank indicator using one of:
 a block code when the total payload size is less than or equal to a threshold value; or
 a convolution code when the total payload size exceeds the threshold value.

8. The method of claim 7, wherein the channel coding further includes:

channel coding the rank indicator of the aggregated encoded joint report using one of:
 a first coding offset parameter when the total payload size is less than or equal to the threshold value; or
 a second coding offset parameter when the total payload size exceeds the threshold value.

9. An apparatus configured for wireless communication, comprising:

means for obtaining identification of a plurality of channel state information-reference signals (CSI-RS) resources associated with a CSI process;

means for determining whether a previous beam selection indicator was reported to a serving base station in a last beam selection indicator reporting opportunity;

means, executable in response to determining the previous beam selection indicator was reported:
 for determining a CSI-RS resource of the plurality of CSI-RS resources indicated by the previous beam selection indicator; and
 for selecting a channel state information (CSI) reporting type based on a number of antenna ports associated with the determined CSI-RS resource;

means, executable in response to determining the previous beam selection indicator was not reported:
 for selecting a default CSI-RS resource of the plurality of CSI-RS resources based on a predefined rule; and
 for selecting the CSI reporting type according to selected default CSI-RS resource; and means for reporting CSI to the serving base station according to the selected CSI reporting type.

10. The apparatus of claim 9, wherein the predefined rule includes one of:

means for determining one of the plurality of CSI-RS resources having a lowest resource index in the CSI process; or means for determining one of the plurality of CSI-RS resources having a maximum antenna port.

11. The apparatus of claim 9, further including:

means for determining whether a rank indicator was reported after reporting of the previous beam selection indicator;

means, executable in response to determining an absence of the rank indicator:
 for identifying a default reference rank; and
 for measuring the CSI of the CSI-RS resource conditioned on the identified default reference rank.

12. The apparatus of claim 11, wherein the means for identifying the default reference rank includes:

means for determining a number of antenna ports associated with the CSI-RS resource identified by a last reported beam selection indicator;

means for identifying a lowest possible rank indicator associated with the number of antenna ports, wherein the default reference rank is the lowest possible rank indicator.

13. An apparatus configured for wireless communication, comprising:

means for obtaining identification of a plurality of channel state information-reference signals (CSI-RS) resources associated with a CSI process;

means for determining whether to combine a beam selection indicator and a rank indicator into a joint report for reporting to a serving base station, wherein the beam selection indicator identifies a CSI-RS resource of the plurality of CSI-RS resources;

means for setting a bit width for the joint report, wherein the bit width is fixed;

means for encoding the joint report; and means for transmitting the encoded joint report to the serving base station.

14. The apparatus of claim 13, wherein the means for setting the bit width includes:

means for determining a rank indicator bit width according to:

$$\text{rank indicator bit width} = \log_2(\min(\max(N_k), N_{layer})),$$

where $N_{layer}$ is a maximum number of layers supported by a user equipment (UE) served by the serving base station and $N_k$ is a number of antenna ports associated with a $k^{th}$ CSI-RS resource of the plurality of CSI-RS resources;

means for determining a beam selection indicator bit width according to:

$$\text{beam selection indicator bit width} = \text{ceil}(\log_2(K)),$$

where K is a number of the plurality of CSI-RS resources; and means for concatenating the beam selection indicator of the beam selection indicator bit width with the rank indicator of the rank bit width into the joint report.

15. The apparatus of claim 13, wherein the means for transmitting the encoded joint report includes means for transmitting the encoded joint report on an uplink shared data channel, the apparatus further including:

means for receiving an aperiodic CSI triggering for CSI reporting for a plurality of CSI processes and a plurality of downlink cells;

means for concatenating the encoded joint report of the rank indicator across the plurality of CSI processes and the plurality of downlink cells;

means for determining a total payload size for the rank indicator of the aggregated encoded joint report;

means for channel coding for the rank indicator using one of:
 a block code when the total payload size is less than or equal to a threshold value; or
 a convolution code when the total payload size exceeds the threshold value.

16. The apparatus of claim 15, wherein the means for channel coding further includes:
means for channel coding the rank indicator of the aggregated encoded joint report using one of:
a first coding offset parameter when the total payload size is less than or equal to the threshold value; or
a second coding offset parameter when the total payload size exceeds the threshold value.

17. An apparatus configured for wireless communication, the apparatus comprising:
at least one processor; and
a memory coupled to the at least one processor,
wherein the at least one processor is configured:
to obtain identification of a plurality of channel state information-reference signals (CSI-RS) resources associated with a CSI process;
to determine whether a previous beam selection indicator was reported to a serving base station in a last beam selection indicator reporting opportunity;
in response to determining the previous beam selection indicator was reported:
to determine a CSI-RS resource of the plurality of CSI-RS resources indicated by the previous beam selection indicator; and
to select a channel state information (CSI) reporting type based on a number of antenna ports associated with the determined CSI-RS resource;
in response to determining the previous beam selection indicator was not reported:
to select a default CSI-RS resource of the plurality of CSI-RS resources based on a predefined rule; and
to select the CSI reporting type according to selected default CSI-RS resource; and
to report CSI to the serving base station according to the selected CSI reporting type.

18. The apparatus of claim 17, wherein the predefined rule includes configuration of the at least one processor to one of:
determine one of the plurality of CSI-RS resources having a lowest resource index in the CSI process; or
determine one of the plurality of CSI-RS resources having a maximum antenna port.

19. The apparatus of claim 17, further including configuration of the at least one processor:
to determine whether a rank indicator was reported after reporting of the previous beam selection indicator;
in response to determining an absence of the rank indicator:
to identify a default reference rank; and
to measure the CSI of the CSI-RS resource conditioned on the identified default reference rank.

20. The apparatus of claim 19, wherein the configuration of the at least one processor to identify the default reference rank includes configuration of the at least one processor:
to determine a number of antenna ports associated with the CSI-RS resource identified by a last reported beam selection indicator;
to identify a lowest possible rank indicator associated with the number of antenna ports, wherein the default reference rank is the lowest possible rank indicator.

21. An apparatus configured for wireless communication, the apparatus comprising:
at least one processor; and
a memory coupled to the at least one processor,
wherein the at least one processor is configured:
to obtain identification of a plurality of channel state information-reference signals (CSI-RS) resources associated with a CSI process;
to determine whether to combine a beam selection indicator and a rank indicator into a joint report for reporting to a serving base station, wherein the beam selection indicator identifies a CSI-RS resource of the plurality of CSI-RS resources;
to set a bit width for the joint report, wherein the bit width is fixed;
to encode the joint report; and
to transmit the encoded joint report to the serving base station.

22. The apparatus of claim 21, wherein the configuration of the at least one processor to set the bit width includes configuration of the at least one processor:
to determine a rank indicator bit width according to:

rank indicator bit width=$\log_2(\min(\max(N_k), N_{layer}))$, where $N_{layer}$ is a maximum number of layers supported by a user equipment (UE) served by the serving base station and $N_k$ is a number of antenna ports associated with a $k^{th}$ CSI-RS resource of the plurality of CSI-RS resources;
to determine a beam selection indicator bit width according to:

beam selection indicator bit width=$\text{ceil}(\log_2(K))$, where K is a number of the plurality of CSI-RS resources; and
to concatenate the beam selection indicator of the beam selection indicator bit width with the rank indicator of the rank bit width into the joint report.

23. The apparatus of claim 21, wherein the configuration of the at least one processor to transmit the encoded joint report includes configuration to transmit the encoded joint report on an uplink shared data channel, the apparatus further including configuration of the at least one processor:
to receive an aperiodic CSI triggering for CSI reporting for a plurality of CSI processes and a plurality of downlink cells;
to concatenate the encoded joint report of the rank indicator across the plurality of CSI processes and the plurality of downlink cells;
to determine a total payload size for the rank indicator of the aggregated encoded joint report;
to channel code for the rank indicator using one of:
a block code when the total payload size is less than or equal to a threshold value; or
a convolution code when the total payload size exceeds the threshold value.

24. The apparatus of claim 23, wherein the configuration of the at least one processor to channel code further includes configuration to channel code the rank indicator of the aggregated encoded joint report using one of:
a first coding offset parameter when the total payload size is less than or equal to the threshold value; or
a second coding offset parameter when the total payload size exceeds the threshold value.

* * * * *

UNITED STATES PATENT AND TRADEMARK OFFICE
CERTIFICATE OF CORRECTION

Page 1 of 1

PATENT NO. : 10,630,364 B2
APPLICATION NO. : 15/765575
DATED : April 21, 2020
INVENTOR(S) : Chao Wei et al.

It is certified that error appears in the above-identified patent and that said Letters Patent is hereby corrected as shown below:

In the Claims

At Column 26, Claim number 5, Line number 42, delete "a CST process" and replace with --a CSI process--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*